US012782488B2

(12) United States Patent
Zlogar et al.

(10) Patent No.: US 12,782,488 B2
(45) **Date of Patent: *Nov. 3, 2026**

(54) SATELLITE ANTENNA WITH SENSOR FOR LINE-OF-SIGHT DETECTION

(71) Applicant: Viasat, Inc., Carlsbad, CA (US)

(72) Inventors: John R. Zlogar, Atlanta, GA (US); Philip A. Lampe, Encinitas, CA (US); Kurt A. Zimmerman, Dunwoody, GA (US)

(73) Assignee: Viasat, Inc., Carlsbad, CA (US)

( * ) Notice: Subject to any disclaimer, the term of this patent is extended or adjusted under 35 U.S.C. 154(b) by 278 days.

This patent is subject to a terminal disclaimer.

(21) Appl. No.: 18/776,415

(22) Filed: Jul. 18, 2024

(65) Prior Publication Data

US 2025/0020753 A1 Jan. 16, 2025

Related U.S. Application Data

(63) Continuation of application No. 17/864,215, filed on Jul. 13, 2022, now Pat. No. 12,078,739, which is a (Continued)

(51) Int. Cl.
*G01S 3/14* (2006.01)
*H01Q 1/12* (2006.01)

(52) U.S. Cl.
CPC ................ *G01S 3/14* (2013.01); *H01Q 1/125* (2013.01)

(58) Field of Classification Search
CPC ...................................................... H01Q 1/125
See application file for complete search history.

(56) References Cited

U.S. PATENT DOCUMENTS

| | | | |
|---|---|---|---|
| 5,348,286 | A | 9/1994 | Babitch |
| 6,169,881 | B1 | 1/2001 | Astrom et al. |

(Continued)

FOREIGN PATENT DOCUMENTS

| | | |
|---|---|---|
| CN | 102540200 | 7/2012 |
| CN | 203180082 | 9/2013 |

(Continued)

OTHER PUBLICATIONS

Haridas, et al., Multi-Frequency Antenna Design For Space-Based Reconfigurable Satellite Sensor Node, IEEE Computer Society, Second NASA/ESA Conference on Adaptive Hardware and Systems, 2007 pp. 1-6, Edinburgh, UK.

*Primary Examiner* — Timothy A Brainard
*Assistant Examiner* — Helena H Seraydaryan
(74) *Attorney, Agent, or Firm* — Holland & Hart LLP

(57) ABSTRACT

Determining alignment and clear line-of-sight (LOS) of a satellite antenna using sensor data from an LOS sensor of the satellite antenna. Described techniques include storing first sensor data captured by the LOS sensor at a first time, the first sensor data indicating a first LOS condition of the satellite antenna corresponding to the satellite antenna having a beam LOS with a satellite of the satellite communication system that is aligned and unobstructed. The techniques may include receiving second sensor data captured by the LOS sensor at a second time after the first time, the second sensor data indicating a second LOS condition of the satellite antenna. The techniques may include determining an LOS condition change for the satellite antenna between the first time and the second time based on a comparison of the second sensor data with the first sensor data.

24 Claims, 19 Drawing Sheets

Related U.S. Application Data continuation of application No. 16/426,670, filed on May 30, 2019, now Pat. No. 11,422,219, which is a continuation of application No. 14/822,581, filed on Aug. 10, 2015, now Pat. No. 10,359,496.

(56) References Cited

U.S. PATENT DOCUMENTS

| | | | |
|---|---|---|---|
| 6,587,699 | B2 | 7/2003 | Olsen |
| 7,123,876 | B2 | 10/2006 | Wang et al. |
| 7,298,325 | B2 | 11/2007 | Krikorian et al. |
| 7,414,576 | B1 | 8/2008 | Liu |
| 8,138,968 | B1 | 3/2012 | Butler |
| 9,503,177 | B1 | 11/2016 | Shi et al. |
| 10,359,496 | B2 | 7/2019 | Zlogar |
| 11,422,219 | B2 | 8/2022 | Zlogar |
| 2007/0115173 | A1 | 5/2007 | Nelson |
| 2008/0026516 | A1 | 1/2008 | Chakravarti et al. |
| 2013/0135146 | A1 | 5/2013 | Ransom et al. |
| 2013/0271320 | A1 | 10/2013 | Trerise |
| 2014/0070991 | A1 | 3/2014 | Liu |
| 2014/0210646 | A1 | 7/2014 | Subramanya |

FOREIGN PATENT DOCUMENTS

| | | | |
|---|---|---|---|
| CN | 203535224 | | 4/2014 |
| EP | 1795914 | B1 | 9/2008 |
| EP | 2455781 | A1 | 5/2012 |
| JP | 5879179 | A | 5/1983 |
| KR | 20070105062 | A | 10/2007 |

SATELLITE ANTENNA WITH SENSOR FOR LINE-OF-SIGHT DETECTION

CROSS REFERENCE

The present application for Patent is a Continuation of U.S. patent application Ser. No. 17/864,215 by ZLOGAR et al., entitled "SATELLITE ANTENNA WITH SENSOR FOR LINE-OF-SIGHT DETECTION" filed Jul. 13, 2022, which is a Continuation of U.S. patent application Ser. No. 16/426,670 by ZLOGAR et al., entitled "SATELLITE ANTENNA WITH SENSOR FOR LINE-OF-SIGHT DETECTION" filed May 30, 2019, which is a continuation of U.S. patent application Ser. No. 14/822,581 by ZLOGAR, et al., entitled "SATELLITE ANTENNA WITH SENSOR FOR LINE-OF-SIGHT DETECTION," filed Aug. 10, 2015, which is expressly incorporated by reference herein.

BACKGROUND

A satellite antenna is typically aligned upon deployment to the location the satellite antenna is to be used. The alignment process may include pointing the satellite antenna in a general area of the target (e.g., a geosynchronous satellite) and partially fixing the satellite antenna to the object (e.g., a building or other structure) or ground on which it is to be mounted. Next, a series of feedback steps may be used to make fine adjustments to the pointing direction of the satellite antenna until it is determined that the satellite antenna is actually aligned with the target. Once a good alignment is determined, an installer may fix the mounted position of the satellite antenna.

A common problem after aligning and mounting a satellite antenna is that its line-of-sight (LOS) conditions may change over time. This may result in degraded performance. Changes in LOS conditions may be the result of changes in pointing direction of the satellite antenna. Causes of changed LOS conditions may include, for example, a weakening of a support structure (e.g., a sagging building), a slipping of a wall mount, an impact to the satellite antenna (e.g., a ball striking the satellite antenna), or an obstruction between the satellite antenna and the satellite (e.g., foliage growing or a new building). Diagnosing degraded performance at the satellite antenna may require rolling a truck to the location so a technician can determine the cause of the degraded performance and attempt to correct it. In some cases, the technician may arrive at the antenna location only to verify that the antenna is still correctly aligned but the antenna is temporarily obstructed by something at the customer site which could have been relatively easily correctable by the customer themselves. Unnecessary truck rolls may lead to increase costs. In other cases, intermittently degraded performance may be due to wind or other temporary condition which may not occur when the technician arrives at the antenna location. This can make it challenging to identify the cause of the degraded performance. If the satellite antenna is misaligned or obstructed, determining a cause of the misalignment or obstruction may be important to allocate costs of realigning the satellite antenna. In addition, early detection of misalignment or obstruction of the satellite antenna may enable a quicker resolution, which may improve the customer experience and reduce the effects of degraded antenna performance on the overall system.

SUMMARY

Methods, systems, and devices are described for line-of-sight (LOS) pointing diagnostics of a satellite antenna. The satellite antenna may include a LOS sensor that captures a field of view (FOV) that includes a beam of the satellite antenna. Data from the LOS sensor may be used as a diagnostic tool for determining if the position of the satellite antenna has changed or an obstruction has occurred. The data may also be used to determine if there is some other reason for degraded performance. The sensor data may be reviewed locally via a satellite terminal or remotely after successful installation and setup having known good LOS conditions of the satellite antenna. The sensor data may be compared with initial data from the LOS sensor that was captured and stored at the outset of the initial good alignment. A misalignment or obstruction may be detected if there is a difference between the sensor data and the stored sensor data associated with good LOS conditions. The sensor data may also be used to, among other things, determine a pointing direction of the satellite antenna, detect an ongoing weather event, and assist in achieving the initial good LOS conditions.

Described examples include a method for use in a satellite communication system. The method may include storing first sensor data captured by an LOS sensor of a satellite antenna at a first time. The first sensor data may indicate a first LOS condition of the satellite antenna. The first LOS condition may correspond to the satellite antenna having a LOS with a satellite of the satellite communication system that is aligned and unobstructed. The method may further include receiving second sensor data captured by the LOS sensor at a second time. The second time may be after the first time. The second sensor data may indicate a second LOS condition of the satellite antenna. The method may also include determining an LOS condition change for the satellite antenna between the first time and the second time based on a comparison of the second sensor data with the first sensor data.

Other described examples include a satellite communication system. The satellite communication system may include a satellite antenna that includes an adjustable mounting device, a satellite transceiver module that transmits and receives data via the satellite antenna, and an LOS sensor coupled with the satellite transceiver module. The satellite communication system may also include an alignment device that receives first sensor data captured by the LOS sensor at a first time. The first sensor data may indicate a first LOS condition of the satellite antenna corresponding to the satellite antenna having a LOS with a satellite of the satellite communication system that is aligned and unobstructed. The alignment device may also receive second sensor data captured by the LOS sensor at a second time after the first time, the second sensor data indicating a second LOS condition of the satellite antenna. The alignment device may also determine an LOS condition change for the satellite antenna between the first time and the second time based on a comparison of the second sensor data with the first sensor data.

Yet other described examples include a satellite communication system that includes a satellite network controller. The satellite network controller may store first sensor data captured by an LOS sensor of a satellite antenna at a first time, the first sensor data indicating a first LOS condition of the satellite antenna corresponding to the satellite antenna having a LOS with a satellite of the satellite communication system that is aligned and unobstructed. The satellite network controller may also receive second sensor data captured by the LOS sensor at a second time after the first time, the second sensor data indicating a second LOS condition of the satellite antenna. The satellite network controller may determine an LOS condition change for the satellite antenna between the first time and the second time based on a comparison of the second sensor data with the first sensor data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
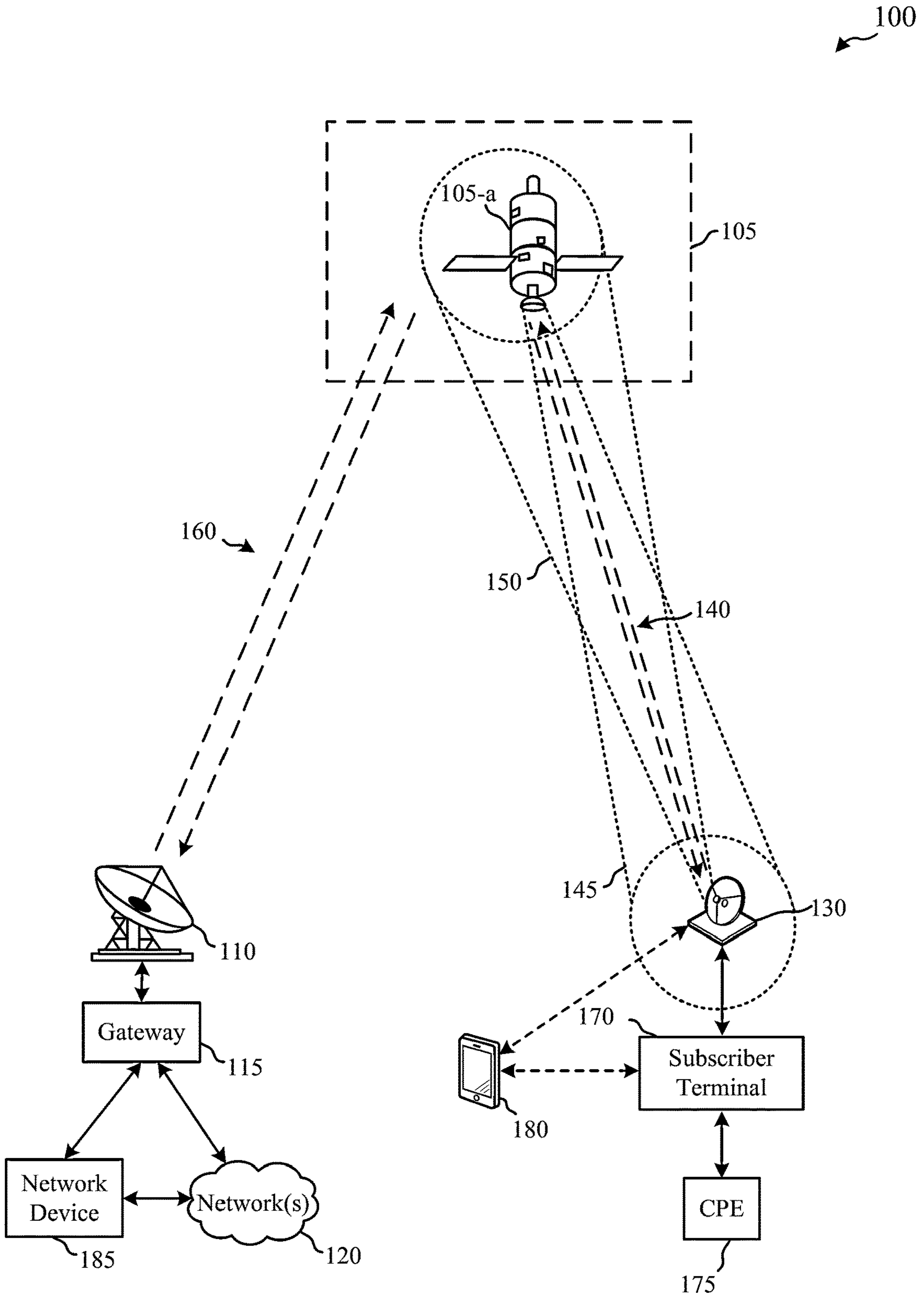
FIG. 1 shows a diagram of a satellite communication system in accordance with various aspects of the disclosure.

The described features generally relate to a satellite antenna positioning and diagnostic techniques and devices used in a satellite communication system. The satellite antenna may include a line-of-sight (LOS) sensor that captures data in a field-of-view (FOV) that includes a beam of the satellite antenna desired to be pointed in a direction at a satellite of the satellite communication system. The LOS sensor data may be used to monitor and verify LOS conditions for the satellite antenna. The LOS sensor may also be used, for example, to detect a weather event, verify unobstructed LOS conditions for an installation location, determine if the pointing direction of the satellite antenna has changed from a known good alignment direction, detect an obstruction or a potential obstruction in the beam of the satellite antenna, and for overlaying feedback for positioning the satellite antenna.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For satellite antennas, particular those used on customer premises, it may be beneficial to be able to remotely or autonomously diagnose problems related to LOS conditions of a satellite antenna. A satellite antenna with good or desired LOS conditions may be aligned and unobstructed, while problems related to poor LOS conditions include misalignment or obstruction of the satellite antenna beam. Various techniques described herein utilize at least one LOS sensor as a diagnostic tool for detecting changes in pointing direction (e.g., misalignment, etc.) and/or obstruction (e.g., tree branch, new building, etc.). The techniques may be used to detect slow degradation of the LOS conditions (e.g., foliage growth, drift of the satellite mount, etc.) and/or for detecting major events (e.g., an object hits the satellite antenna, tree branch falls in front of the beam, etc.).

The LOS sensor may be a camera (e.g., a charged couple device (CCD)), radar, or LIDAR sensor, for example. The LOS sensor may use optical, radio frequency, or infrared portions of the electromagnetic spectrum, for example. LOS sensor data for a particular time after installation can be compared with previously stored LOS sensor data corresponding to known good LOS conditions (e.g., aligned and unobstructed). The comparison can be used to determine a change in an LOS condition of the satellite antenna (e.g., from aligned to misaligned). In some embodiments, prior to storage, the LOS sensor data is automatically processed to identify one or more reference features in the surrounding environment. The processed sensor data corresponding to a representation of these reference features can then be stored while the remaining sensor data is discarded.

The methods, systems, and devices described herein may reduce the cost of installation and maintenance for satellite antennas, especially for non-professional or do-it-yourself installers. The LOS conditions of the satellite antenna may be viewed locally at the satellite or remotely after an initial successful installation. The LOS sensor data may be used to determine if the pointing direction of the satellite antenna has changed since the initial installation. In some cases, the LOS sensor data may be used to rule out misalignment or obstruction of the satellite antenna as the reason for poor signal performance. Further, repositioning or performing an initial installation may be aided by the LOS sensor data. The LOS sensor may also be used, for example, to detect a weather event, determine if the pointing direction of the satellite antenna is drifting, determine how the pointing direction of the satellite antenna has changed, detect an obstruction or a potential obstruction in the beam of the satellite antenna, and for overlaying feedback for aligning the satellite antenna.

FIG. 1 shows a diagram of a satellite communication system 100 in accordance with various aspects of the disclosure. The satellite communication system 100 includes a satellite system 105, a gateway 115, a gateway antenna system 110, a satellite antenna 130, and a subscriber terminal 170. The gateway 115 communicates with one or more networks 120. A network device 185 may be coupled with the gateway 115 and may control aspects of the satellite communication system 100. The subscriber terminal 170 communicates with one or more customer premises equipment (CPE) devices 175. In operation, the satellite communication system 100 provides for two-way communications between the CPE devices 175 and the network 120 through the satellite system 105 and the gateway 115.

The satellite system 105 may include one or more satellites, such as a satellite 105-*a*. The one or more satellites in the satellite system 105 may include any suitable type of communication satellite. In some examples, some or all of the satellites may be in geostationary orbits. In other examples, any appropriate orbit (e.g., low earth orbit (LEO), etc.) for satellite system 105 may be used. Some or all of the satellites of satellite system 105 may be multi-beam satellites configured to provide service for multiple service beam coverage areas in a predefined geographical service area.

The gateway antenna system 110 may be two-way capable and designed with adequate transmit power and receive sensitivity to communicate reliably with the satellite system 105. The satellite system 105 may communicate with the gateway antenna system 110 by sending and receiving signals through one or more beams 160. The gateway 115 sends and receives signals to and from the satellite system 105 using the gateway antenna system 110. The gateway 115 is connected to the one or more networks 120. The networks 120 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

The satellite antenna 130 may be two-way capable and designed with adequate transmit power and receive sensitivity to communicate reliably with the satellite system 105. The satellite system 105 may communicate with the satellite antenna 130 by sending and receiving signals 140. The subscriber terminal 170 may perform functions related to generating and processing signals 140 for communication via the satellite antenna 130 (e.g., modulation, demodulation, encoding, decoding, etc.). The subscriber terminal 170 may provide network access service or other communication services (e.g., broadcast media, etc.) to CPE devices 175 via the satellite system 105. The CPE devices 175 may include user devices such as, but not limited to, mobile phones, personal digital assistants (PDAs), other handheld devices, netbooks, notebook computers, tablet computers, laptops, display devices (e.g., TVs, computer monitors, etc.), printers, and the like. The CPE devices 175 may also include any equipment located at a premises of a subscriber, including routers, firewalls, switches, private branch exchanges (PBXs), Voice over Internet Protocol (VoIP) gateways, and the like.

The satellite communication system 100 may operate in one or more frequency bands. For example, satellite communication system 100 may operate in the International Telecommunications Union (ITU) Ku, K, or Ka-bands, C-band, X-band, S-band, L-band, and the like. Additionally, the satellite antenna 130 may be used in other applications besides ground-based stationary systems such as onboard boats, onboard aircraft, vehicles, or the like.

The satellite 105-*a* may emit one or more beams, such as beam 145 that is directed towards a beam coverage area that includes the satellite antenna 130. The satellite 105-*a* may be a multi-beam satellite and may have other beams covering other beam coverage areas.

The satellite antenna 130 has a main beam 150. The main beam 150 may be defined by a beam contour within which the satellite antenna 130 may detect or transmit electromagnetic radiation with desired performance characteristics. When the satellite 105-*a* is within the main beam 150, the satellite antenna 130 is considered to be aligned with the satellite 105-*a*. Even when the satellite antenna 130 is aligned with the satellite 105-*a*, obstructions within the main beam 150 of the satellite antenna 130 may cause performance degradation. Therefore, desired performance for signals 140 may be achieved when the satellite 105-*a* is within the main beam 150 and the main beam 150 is unobstructed.

An LOS sensor may be mounted on the satellite antenna 130 and may capture image data (e.g., optical, IR, etc.) within an FOV of the LOS sensor. The FOV of a sensor may be determined by specifics of the sensor. For example, if the sensor is a camera, the FOV of the camera is determined by a focal length of a lens of the camera and an image sensor capture area of the camera (e.g., aperture). In some cases, the FOV of the LOS sensor may include the direction of the main beam 150 of the satellite antenna 130.

The LOS sensor data may be used to detect changes related to the LOS conditions of the satellite antenna 130. The LOS sensor data may be used, for example, to determine if the pointing direction of the satellite antenna has changed and possible reasons for the change (e.g., drift, sudden movement, etc.), detect a weather event, or detect an obstruction or a potential obstruction in the beam of the satellite antenna, as described in more detail below.

Although examples described herein use a two-way satellite communication system for illustrative purposes, the techniques described herein are not limited to such satellite communication embodiments. For example, the LOS sensor and techniques could be used on antennas for point-to-point terrestrial links and also may not be limited to two-way communication. In one embodiment, the LOS sensor and techniques may be used on antennas for a receive-only implementation, such as for receiving satellite broadcast television.

Figure 2A:
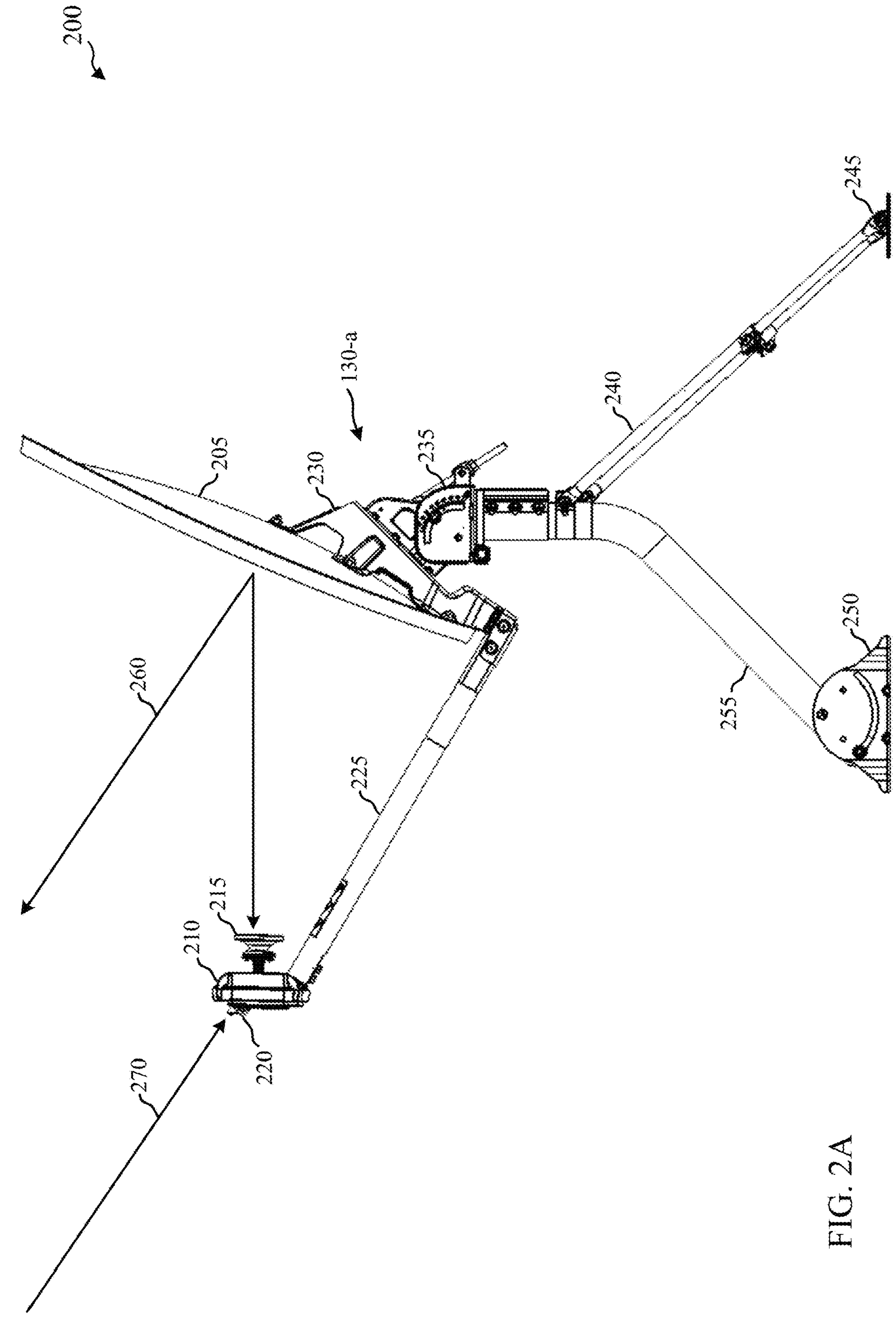
FIGS. 2A-2B show views of a diagram of a satellite antenna in accordance with various aspects of the disclosure.

FIG. 2A shows a side view 200 of a satellite antenna 130-*a* in accordance with various aspects of the disclosure. The satellite antenna 130-*a* may be an example of aspects of the satellite antenna 130 described with reference to FIG. 1.

The satellite antenna 130-*a* includes a reflector 205 mounted to a mast 255 via a mounting bracket assembly 235. A satellite communication assembly 210 is attached to the reflector 205 via an arm 225 and a skew plate 230 of the mounting bracket assembly 235. The satellite communication assembly 210 includes a feed horn 215 and a transceiver. The satellite communication assembly 210 may process signals transmitted by and received at the satellite antenna 130-*a*. In some examples, the satellite communication assembly 210 may be a transmit and receive integrated assembly (TRIA), which may be coupled with a subscriber terminal (e.g., subscriber terminal 170 of FIG. 1, etc.) via an electrical feed. As illustrated, the satellite communication assembly 210 includes circuitry to support satellite communications assembled into a housing with the feed horn 215 opening towards the reflector 205. Electromagnetic signals, such as signals 140 of FIG. 1, may be transmitted by and received at the satellite communication assembly 210 via downlink and uplink beams. A boresight 260 may generally illustrate a principal axis (e.g., direction of maximum gain, etc.) of at least one of the downlink and uplink beams.

The mounting bracket assembly 235 may be of a conventional design and can include azimuth, elevation, and skew adjustments of the reflector 205 relative to the mast 255. Elevation refers to the angle between the antenna 130-*a* and the horizon, which may be measured with reference to the boresight 260. Azimuth refers to the angle between the boresight 260 and a direction of true north in a horizontal plane. Skew refers to the angle of rotation about the boresight 260.

The mounting bracket assembly 235 may include, for example, bolts that can be loosened to permit the satellite antenna 130-*a* to be separately moved in azimuth, elevation, and skew. After positioning the satellite antenna 130-*a* to the desired position in one of azimuth, elevation, and skew, the bolts for that portion of the mounting bracket assembly 235 can be tightened and other bolts loosened to permit a second adjustment to be made.

The mounting bracket assembly 235 may be installed on a top portion of the mast 255. On the other end, the mast 255 may attach to a mounting surface via a foot 250. The foot 250 may be, for example, a mounting bracket that can be used to affix the mast 255 to a structure. In some examples, the mast 255 is also supported by legs 240 that provide further attachment and stability using mounting brackets 245 to attach to the structure. One or more of the foot 250 and the mounting brackets 245 may function as an adjustable mounting device. The mast 255 may be installed and adjusted (e.g., using adjustments on legs 240) such that the top portion is plumb (i.e., relatively perpendicular to the horizon), allowing the elevation and azimuth of the reflector 205 to be adjusted independently via the mounting bracket assembly 235. The installer may then position the reflector 205 to the proper azimuth, elevation, and skew. As described in more detail below, the installer positions the satellite antenna 130-*a* to point the beam (e.g., boresight 260) at a target (e.g., a satellite). The installer may position the satellite antenna 130-*a* by moving the entire satellite antenna 130-*a* by hand. Alternatively, the satellite antenna 130-*a* may be positioned using motors or other automated mechanisms.

The satellite antenna 130-*a* may, for example, be initially pointed by the installer such that the boresight 260 is pointed in the general direction of the satellite. The initial azimuth, elevation, and skew angles for pointing the satellite antenna 130-*a* can be determined by the installer based on the known location of the satellite and the known geographic location where the satellite antenna 130-*a* is being installed. In the illustrated embodiment, the surface of the reflector 205 is non-parabolic and includes a major axis (the longest line through the center of the reflector 205) and a minor axis (the shortest line through the center of the reflector 205). The installer can adjust the skew angle of the satellite antenna 130-*a* via the skew plate 230 until the major axis of the reflector is aligned with the geostationary arc.

Once the satellite antenna 130-*a* is coarsely positioned to the general directional coordinates of the first satellite, the elevation and/or azimuth angles can be further adjusted by the installer to fine tune the pointing until the satellite antenna 130-*a* is sufficiently pointed at the satellite group. The techniques for determining when the boresight 260 is sufficiently pointed at the satellite can vary from embodiment to embodiment.

In one embodiment, the satellite antenna 130-*a* may be fine pointed using the signal strength information of a signal received from the satellite, such as the forward downlink signal. Other criteria may also or alternatively be used to fine point the satellite antenna 130-*a*.

A measurement device, such as a power meter, may be used to directly measure the signal strength of the received signal. Alternatively, a measurement device may be used to measure some other metric indicating the signal strength of the received signal. The measurement device may for example be an external device that the installer temporarily attaches to the electrical feed. As another example, the measurement device may be integrated into the transceiver. In such a case, the measurement device may for example produce audible tones indicating signal strength to assist the installer in pointing the satellite antenna 130-*a*.

The installer can then iteratively adjust the elevation and/or azimuth angle of the satellite antenna 130-*a* until the received signal strength, as measured by the measurement device, reaches a predetermined value. In some embodiments, the installer adjusts the position of the satellite antenna 130-*a* until the received signal strength is maximized. In other words, the satellite antenna 130-*a* is positioned such that the peak of the beam (e.g., boresight 260) is pointed directly at the satellite.

Once the beam is sufficiently pointed at the satellite, the installer can immobilize the mounting bracket assembly 235 to preclude further movement of the satellite antenna 130-*a*.

The satellite communication assembly 210 may also include at least one LOS sensor 220. The LOS sensor 220 may be any type of sensor that can be used to facilitate positioning or diagnostic monitoring of the satellite antenna 130-*a*, such as, but not limited to, a camera sensor, a radar or LIDAR sensor (which may be a transceiver), or an infrared sensor. The LOS sensor 220 may be oriented to receive image data along an FOV generally pointed along axis 270. The LOS sensor 220 may be positioned on the satellite communication assembly 210 such that the axis 270 is generally parallel with boresight 260. That is, the LOS sensor 220 may point in approximately the same direction as the main beam 150 from the feed horn reflected off the reflector 205. Thus, the LOS sensor 220 can sense data within a FOV including at least part of the main beam 150 of FIG. 1. For example, the FOV of the LOS sensor 220 may be wider or narrower than the main beam 150.

Figure 2B:
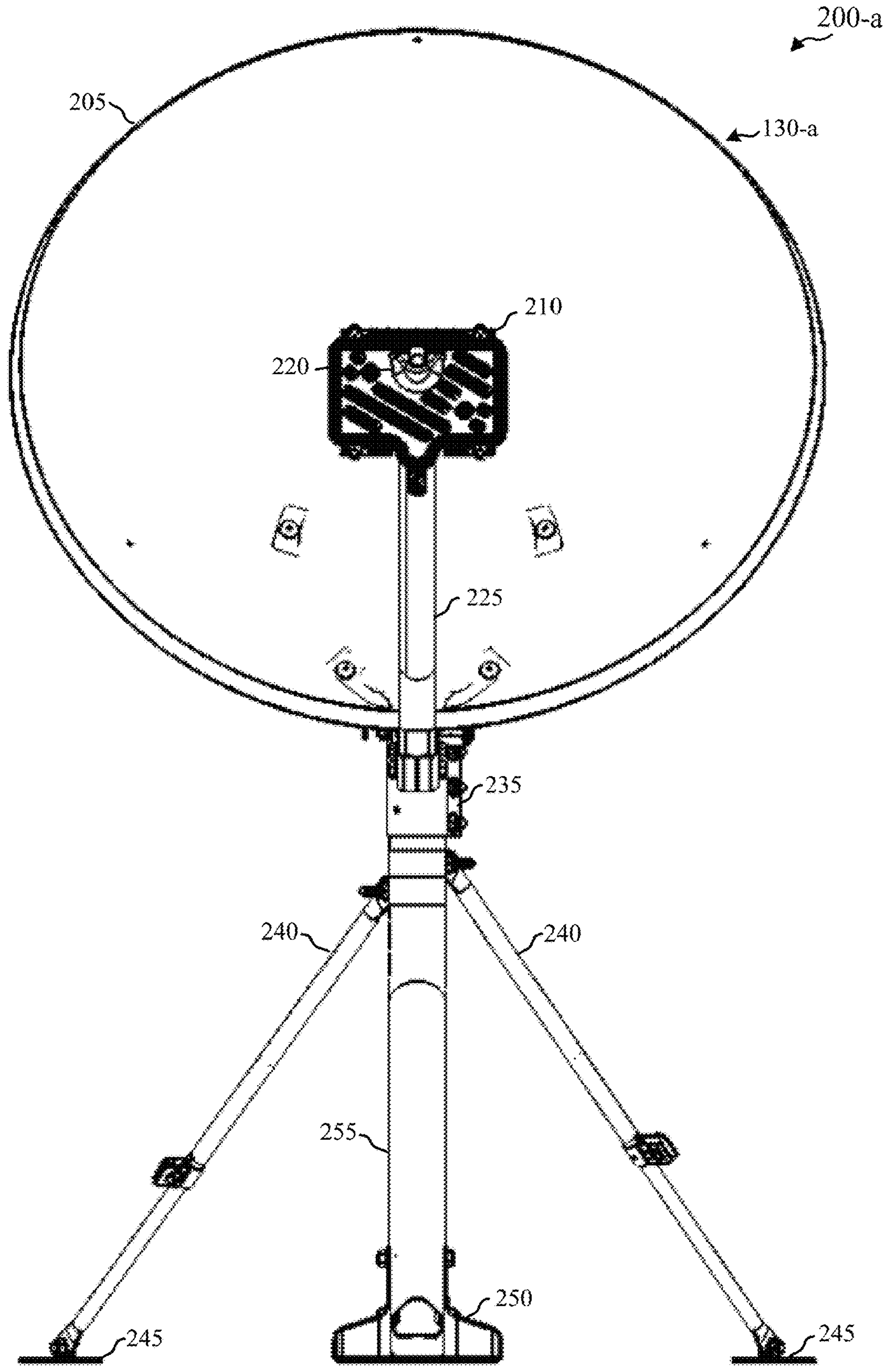

FIG. 2B shows a front view 200-*a* of a satellite antenna 130-*a* in accordance with various aspects of the disclosure. The satellite antenna 130-*a* may be an example of aspects of the satellite antennas 130 described with reference to FIGS. 1 and 2A.

The components of the satellite antenna 130-*a* in FIG. 2B may be the same as the components of the satellite antenna 130-*a* in FIG. 2A and are not further discussed for brevity. However, in other examples, the satellite antenna 130-*a* may have a different mounting structure than that shown in FIGS. 2A and 2B, such as, for example, a mounting structure suitable to mount on a pole. In examples where the satellite antenna 130-*a* is mounted on a moving object (e.g., a vehicle, aircraft, boat, etc.), or the target satellite is moving (e.g., LEO orbit, etc.) the satellite antenna 130-*a* may include one or more mechanical positioning elements (e.g., gimbal, etc.) to reposition the satellite antenna to track the target satellite. These positioning elements may be automatically controlled to reposition the satellite antenna as the object and/or satellite move relative to each other.

Figure 3:
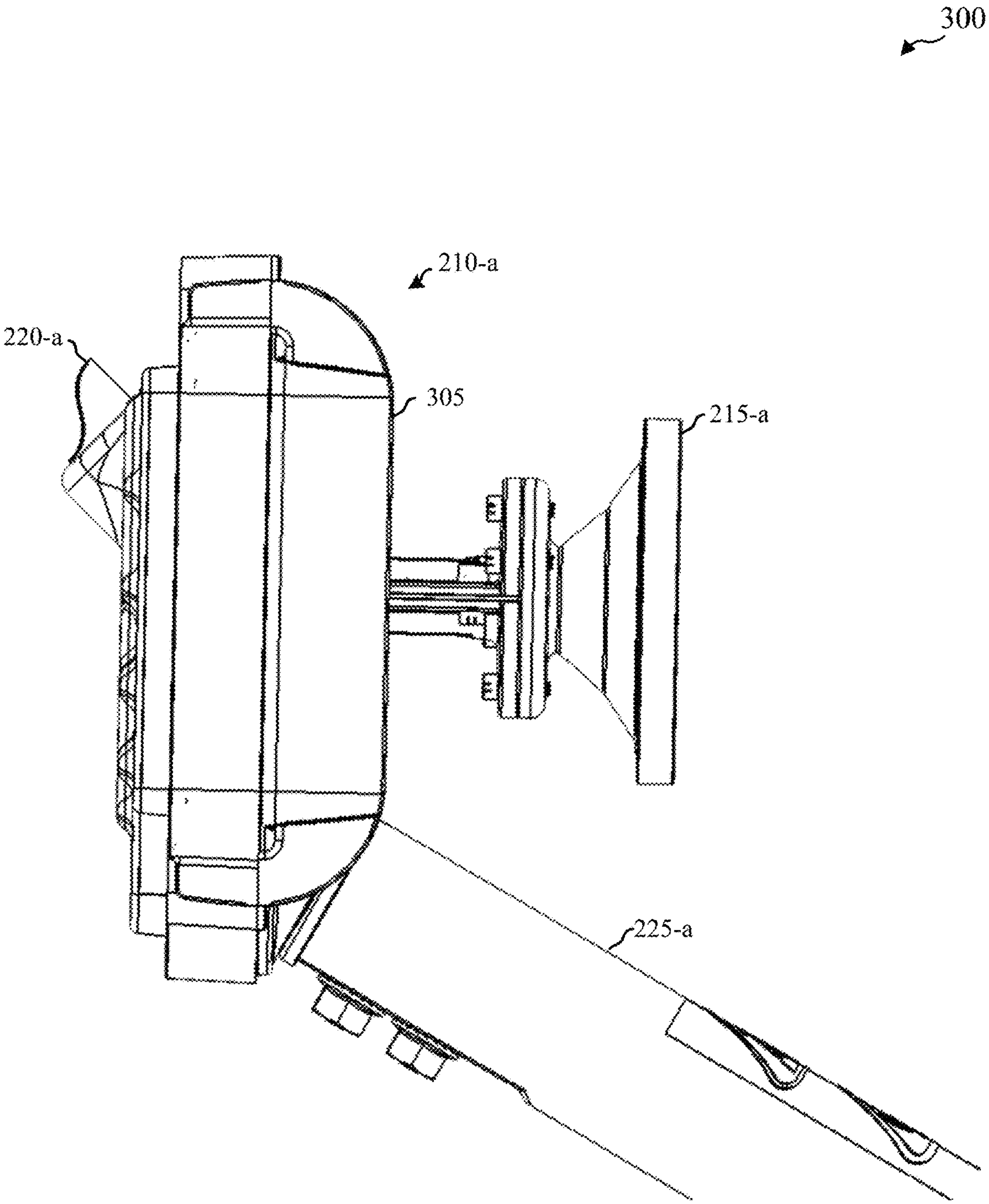
FIG. 3 shows a diagram of a satellite communication assembly in accordance with various aspects of the disclosure.

FIG. 3 shows a diagram 300 of a satellite communication assembly 210-*a* in accordance with various aspects of the disclosure. The satellite communication assembly 210-*a* may be an example of one or more aspects of the satellite communication assembly 210 described with reference to FIGS. 2A and 2B.

The satellite communication assembly 210-*a* may include a feed horn 215-*a* and an LOS sensor 220-*a* as part of a housing 305. An arm 225-*a* may be coupled with the housing 305. The housing 305 may contain circuitry for satellite communications, including components for converting between radio frequency signals transmitted and received by the satellite antenna 130-*a* via the feed horn 215-*a* and electrical signals generated or processed by a subscriber terminal or modem unit (e.g., amplifiers, filters, etc.). The housing 305 may also contain circuitry for the LOS sensor 220-*a*. The housing 305 may protect the circuitry and the LOS sensor 220-*a* from weather. The components of the satellite communication assembly 210-*a* may be the same as the components of the satellite communication assembly 210-*a* and are not further discussed for brevity.

FIGS. 4A-4F are a series of images of an FOV for an LOS sensor, such as the LOS sensor 220 of FIGS. 2A, 2B, and 3, that show various LOS conditions for the satellite antenna. For purposes of illustration, the LOS sensor is a camera producing image data corresponding to a visible portion of the electromagnetic spectrum. In other examples, other types of LOS sensors may be used. The LOS sensor may be an example of one or more aspects of the LOS sensors 220 of FIGS. 2A, 2B, and 3.

Figure 4A:
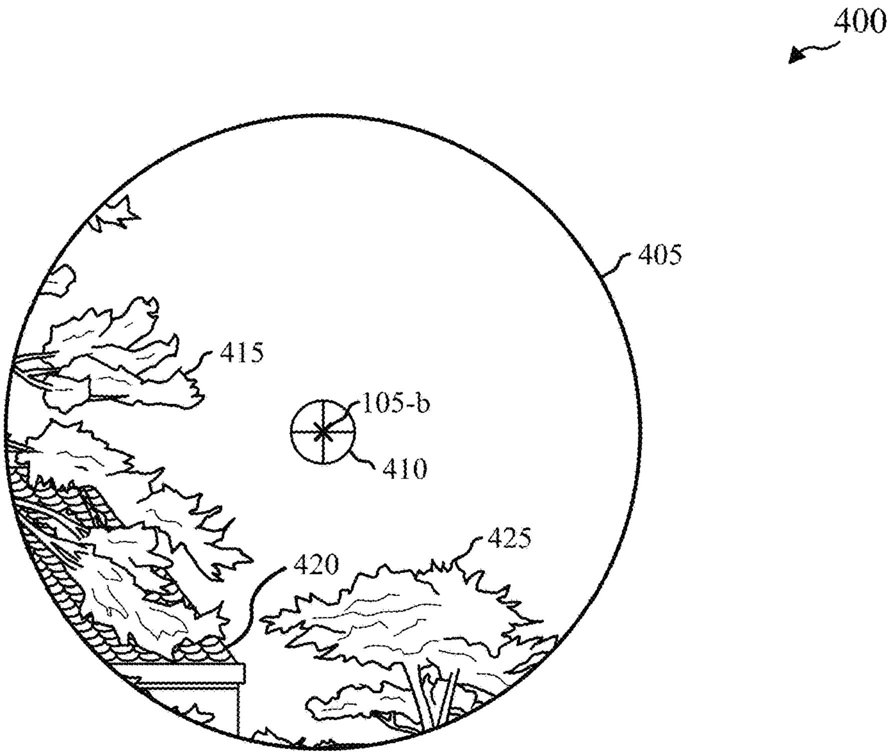
FIGS. 4A-4F show diagrams illustrating FOV images from an LOS sensor of a satellite antenna in accordance with various aspects of the disclosure.

FIG. 4A shows a diagram 400 illustrating a first image of an FOV 405 from an LOS sensor of a satellite antenna in accordance with various aspects of the disclosure. The FOV 405 represents an area over which the LOS sensor may sense information, such as visible light. The FOV image 405 may be the same as or at least partially overlap the main beam of the satellite antenna. A beam contour 410 (e.g., 3 dB contour) of the main beam of the satellite antenna is represented as a centered circle in the FOV 405, with the center of the circle illustrating the boresight of the satellite antenna. The satellite antenna is aligned with a target when the main beam of the satellite antenna has sufficient gain in the direction of the target to permit signal communication having desired performance characteristics.

FIG. 4A represents good LOS conditions for the satellite antenna because the satellite 105-*b* (represented by the reference marker "x") is within the beam contour 410, and the beam contour 410 is unobstructed. That is, the satellite antenna is aligned to the satellite 105-*b* and no objects are blocking the beam contour 410. While the FOV image 405 shows a tree 415, a building 420, and another tree 425, these objects are not obstructing beam contour 410. In one example, this FOV 405 may have been associated with known good LOS conditions of the satellite antenna (e.g., set upon successful installation, etc.). Sensor data corresponding to the illustrated FOV 405 may be stored in a memory (e.g., a memory of an alignment device) as a first LOS condition. That is, the first LOS condition of the satellite antenna may correspond to the satellite antenna being pointed at the satellite 105-*b* and having an unobstructed beam contour 410 at a first time. In some embodiments, prior to storage, the sensor data from the LOS sensor may be automatically processed (e.g., by the LOS sensor, an alignment device discussed below, or other component of the satellite antenna) to identify one or reference features (discussed in more detail below). The processed sensor data corresponding to a representation of the reference features may then be stored, while the remaining sensor data is discarded.

Figure 4B:
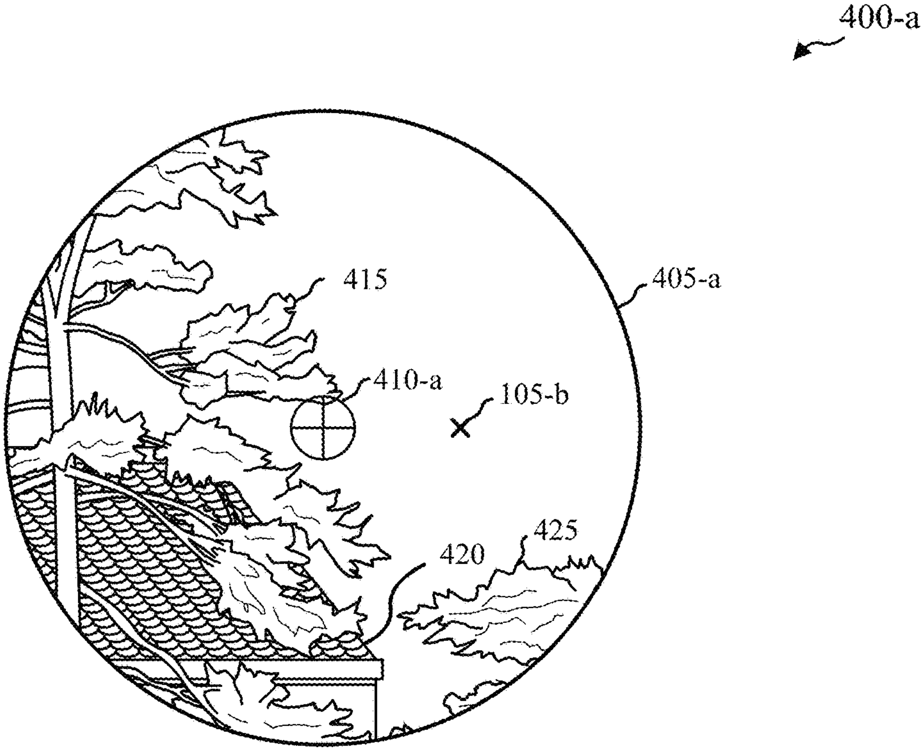

FIG. 4B shows a diagram 400-*a* illustrating a second image of an FOV 405-*a* from an LOS sensor of a satellite antenna in accordance with various aspects of the disclosure. The FOV 405-*a* may be, for example, the FOV of the same LOS sensor as FOV 405 taken at a different point in time. The FOV 405-*a* may include a satellite antenna beam contour 410-*a*, which may be an example of the beam contour 410 of FIG. 4A.

As illustrated, the beam contour 410-*a* has moved to the left from the position of the beam contour 410 such that the beam contour 410-*a* no longer includes the satellite 105-*b*. This movement may be due to an azimuth drift of the satellite antenna, such as a drift in the mounting or a slipping of the mounting bracket assembly 235. In this example, the satellite antenna is not aligned with the satellite 105-*b*, since the beam contour 410-*a* does not include the satellite 105-*b*. The FOV 405-*a* may be associated with a second LOS condition at a second time after the first time associated with the first LOS condition.

An alignment device may determine that the satellite antenna is misaligned by comparing the FOV 405-*a* to the FOV 405. The FOV 405-*a* may include the tree 415 and the building 420. In some examples, the alignment device may detect the position change of the FOV 405-*a* based on one or more reference features in the FOV 405-*a*, which may include determining that the building 420, the tree 415, or the tree 425 have changed positions within the FOV 405-*a* with respect to their positions in the FOV 405. For example, the alignment device may select a feature in the FOV 405, such as the building 420, as a reference feature and determine its position in the FOV 405. The alignment device may use a pixel map of the image of the FOV 405-*a* to determine a position of the reference feature, for example. The alignment device may then identify the same reference feature in the FOV 405-*a*, which may be done using the same or different techniques. Next, the alignment device may determine the position of the reference feature in the FOV 405-*a*. The alignment device may then compare the position of the reference feature in the FOV 405 with the position of the reference feature in the FOV 405-*a*. If the reference feature has moved in FOV 405-*a* relative to FOV 405, the alignment device may determine that the LOS condition for the satellite antenna has changed. Based on the amount of change of position of the reference feature, the alignment device may determine if the satellite 105-*b* is likely to be outside of contour 410-*a*. Thus, the alignment device may detect a misalignment or obstruction of the satellite antenna based on a comparison of the LOS sensor data from the second time to the LOS sensor data from the first time.

In other examples, the alignment device may receive a series of captured sensor data indicating a series of LOS conditions for the satellite antenna and detect a change in alignment or obstruction of the satellite antenna. For example, a series of FOV images may indicate slight movement in reference features, and while the beam contour 410 may still be aligned with the satellite 105-*b*, the alignment device may predict that continued change in pointing direction may cause a performance degradation of the satellite antenna at a future time. Based on this prediction, the alignment device may issue a warning message based on the predicted performance degradation of the satellite antenna. The warning message may indicate the satellite antenna may become misaligned or obstructed. This may prevent a disruption in service to re-align the satellite antenna or fix the cause of the change in pointing direction.

In some examples, the satellite antenna may be configured to autonomously track one or more moving satellites. For example, in a LEO system, the satellite antenna may track a first satellite while it passes over the satellite location, and then switch to a tracking a second, different satellite once the first satellite passes out of view. The satellite antenna may use a series of FOV images from the LOS sensor to predictively switch service prior to service interruptions. For example, based on a series of FOV images, the satellite antenna may determine that the first satellite is about to pass behind a building and switch service to the second satellite before losing service from the first satellite.

Figure 4C:
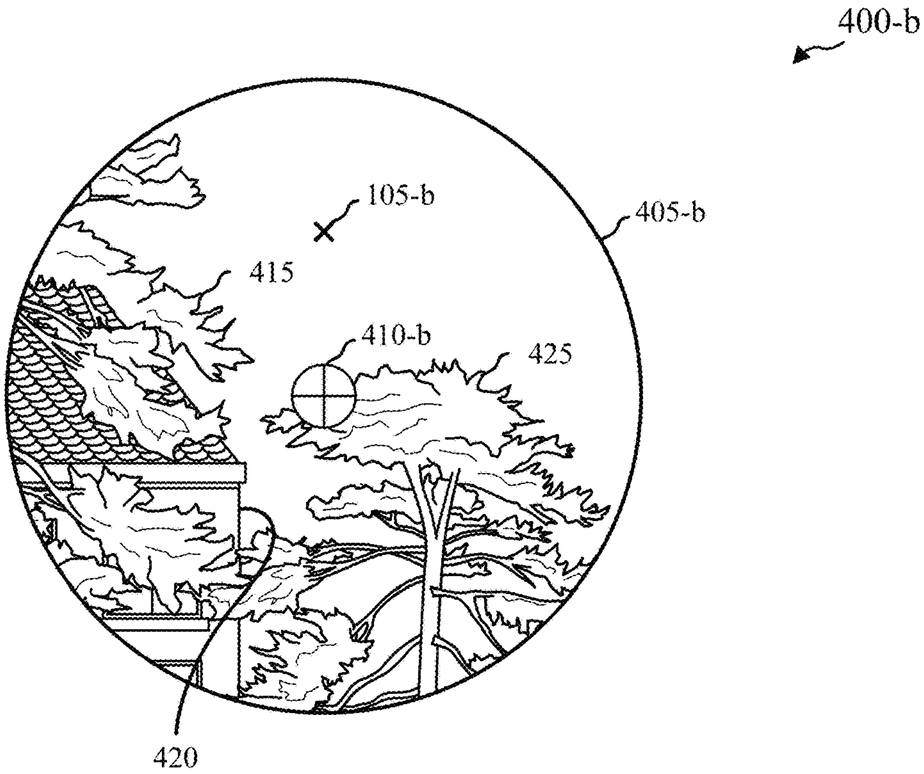

FIG. 4C shows a diagram 400-*b* illustrating a third image of an FOV 405-*b* from an LOS sensor of a satellite antenna in accordance with various aspects of the disclosure. The FOV 405-*b* may be the FOV of the same LOS sensor as illustrated by FIG. 4A or 4B at a different point in time. The FOV 405-*b* may include a beam contour 410-*b*, which may be an example of the beam contour 410 of FIG. 4A or FIG. 4B.

As illustrated, the beam contour 410-*b* has moved down from the position it was at in FIG. 4A. The beam contour 410-*b* no longer includes the satellite 105-*b*. This movement may be due to an elevation drift of the satellite antenna, such as a drift in the mounting or a slipping of the mounting bracket assembly 235. As shown, the satellite antenna is not aligned with the satellite 105-*b*, since the beam contour 410-*b* does not include the satellite 105-*b*.

An alignment device may determine that the satellite antenna is misaligned by comparing the FOV 405-*b* to the FOV 405. The FOV 405-*b* may include the tree 415, the building 420, and the tree 425. In some examples, the alignment device may detect the position change of the FOV 405-*b* based on one or more detected reference features, which may include determining that one or more of the building 420, the tree 415, or the tree 425 have changed positions within the FOV 405-*b* with respect to their positions in the FOV 405.

Figure 4D:
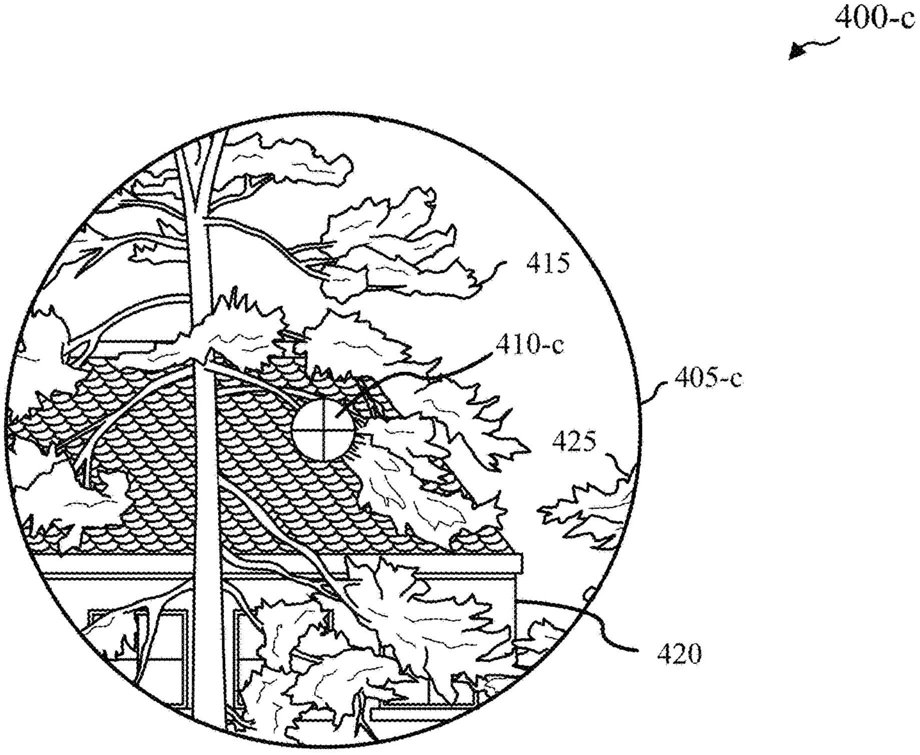

FIG. 4D shows a diagram 400-*c* illustrating a fourth image of an FOV 405-*c* from an LOS sensor of a satellite antenna in accordance with various aspects of the disclosure. The FOV 405-*c* may be the FOV for the same LOS sensor as FOVs 405 illustrated in FIGS. 4A-4C at a different point in time. The FOV 405-*c* may include a beam contour 410-*c*, which may be an example of the beam contour 410 of FIGS. 4A-4C.

As illustrated, the beam contour 410-*c* has moved to the left and down from the position of the beam contour 410 in FIG. 4A. This movement may be due to an impact at the satellite antenna, such as a ball slamming into the satellite antenna. In other examples, the movement may be due to another cause. The beam contour 410-*c* no longer includes the satellite 105-*b*. In FIG. 4D, the FOV 405-*c* does not even cover the position of the satellite 105-*b*. By examining an amount of change in pointing direction over the period of time of change in pointing direction, some information about the cause of the change in pointing direction may be inferred. For example, if the change in LOS conditions between FOV 405 and FOV 405-*c* has occurred over a relatively short period of time, it may be inferred that a major event has affected the position of satellite antenna (e.g., something has impacted the satellite antenna or a structural component has been damaged, etc.)

Figure 4E:
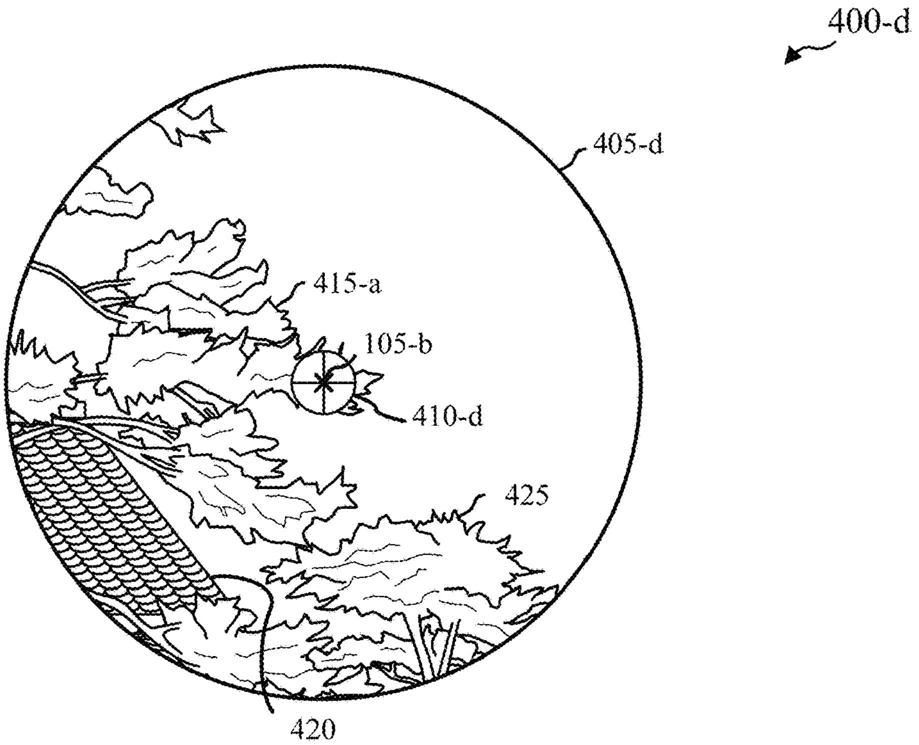

An alignment device may determine that the satellite antenna is misaligned by comparing the FOV 405-*c* to an FOV 405 of FIGS. 4A-4C. The FOV 405-*c* may include the tree 415, the building 420, and the tree 425. In some examples, the alignment device may detect the position change of the FOV 405-*c* based on one or more reference images in the FOV 405-*c*, which may include determining that one or more of the building 420, the tree 415, or the tree 425 have changed positions within the FOV 405-*c* with respect to their positions in the FOV 405. FIG. 4E shows a diagram 400-*d* illustrating a fifth image of an FOV 405-*d* from an LOS sensor of a satellite antenna in accordance with various aspects of the disclosure. The FOV 405-*d* may be the FOV for the same LOS sensor as FOVs 405 illustrated in FIG. 4A-4D or 4F at a different point in time. The FOV 405-*d* may include a beam contour 410-*d*, which may be an example of the beam contour 410 of FIGS. 4A-4D.

As illustrated in FIG. 4E, the beam contour 410-*d* has remained stationary with respect to the position of the beam contour 410 in FIG. 4A. However, the beam contour 410-*d* is obstructed by foliage of the tree 415-*a*. The tree 415-*a* may be an example of the tree 415 of FIGS. 4A-4D that has grown. Because the beam contour 410-*d* is obstructed by the tree 415-*a*, the beam contour 410-*d* now does not have an unobstructed LOS with the satellite 105-*b*. An alignment device may determine that the beam contour 410-*d* is obstructed by detecting a reference feature within the beam contour 410-*d*. In another example, the alignment device may determine that the beam contour 410-*d* is obstructed by comparing the FOV 405-*d* to an FOV 405 of FIG. 4A-4D or 4F. The alignment device may output an indication that the beam contour 410-*d* is obstructed.

Figure 4F:
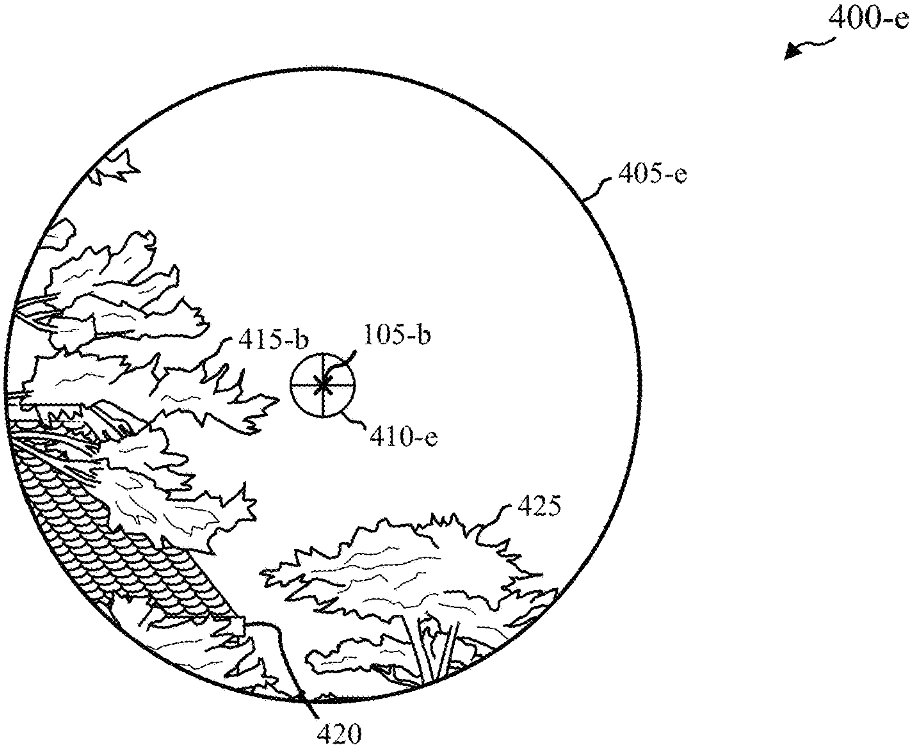

FIG. 4F shows a diagram 400-*e* illustrating a sixth image of an FOV 405-*e* from an LOS sensor of a satellite antenna in accordance with various aspects of the disclosure. The FOV 405-*e* may be the FOV 405 of FIGS. 4A-4E at a different point in time. The FOV 405-*e* may include a beam contour 410-*e*, which may be an example of the beam contour 410 of FIGS. 4A-4E.

In one example, FOV 405-*e* may be an example of sensor data of the LOS sensor taken upon initial installation and setup of the satellite antenna. While the beam contour 410-*e* is unobstructed in FIG. 4F, this positioning of the satellite antenna may be a poor choice because the tree 415 may grow and eventually obstruct the beam contour 410-*e* (e.g., as in FIG. 4E).

In another example, FOV 405-*e* may illustrate sensor data of the LOS sensor taken between the times of FOV 405 and FOV 405-*d*. The beam contour 410-*e* appears to have remained stationary with respect to the position of the beam contour 410 in FIG. 4A. Further, the beam contour 410-*e* still has an unobstructed view of a satellite 105-*b*. However, the alignment device may determine based comparing the reference features 415 and 415-*b* of FOV 405 and FOV 405-*e*, respectively, that the tree 415 is growing and eventually will obstruct the beam contour 410-*e*. The alignment device may receive a series of captured sensor data (e.g., including FOV 405 and FOV 405-*e*) indicating a series of LOS conditions for the satellite antenna captured after the first time. If the alignment device detects a change over time in a position of a reference feature based on the series of captured sensor data that will soon cause an obstruction to the beam, the alignment device may issue a predicted obstruction warning. In the example of FIG. 4F, the alignment device may issue a warning message to a user of the satellite antenna. Once notified of the trend in the growth of the tree 415-*b*, the user may trim the tree 415-*b* to prevent it from obstructing the beam contour 410-*e*.

Figure 5:
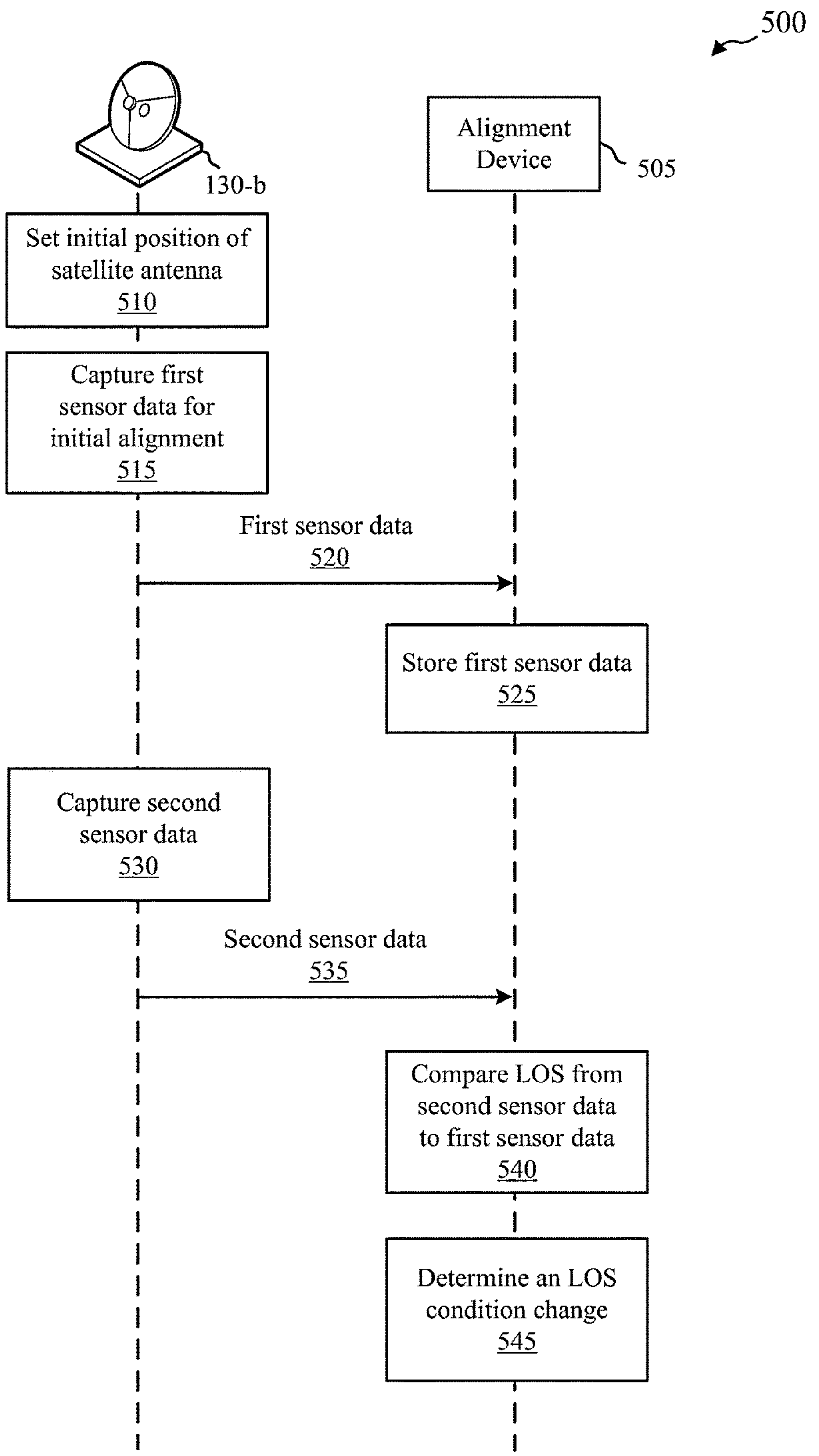
FIG. 5 is a flow diagram illustrating a process of determining a LOS condition change in accordance with various aspects of the disclosure.

FIG. 5 is a flow diagram illustrating a process 500 of determining an LOS condition change in accordance with various aspects of the disclosure. The process 500 includes communication between a satellite antenna 130-*b* and an alignment device 505. The satellite antenna 130-*b* may be an example of aspects of the satellite antenna 130 described with reference to FIGS. 1, 2A-2B, and 3. Functions of the alignment device 505 may be implemented in the satellite antenna, a modem/transceiver (e.g., subscriber terminal 170 of FIG. 1, etc.), or may be implemented in a network controller (e.g., network device 185 of FIG. 1, etc.), for example.

The alignment device 505 may process sensor data to determine LOS conditions for the satellite antenna 130-*b*, may provide feedback regarding positioning of the satellite antenna 130-*b*, and may issue warning messages that indicate poor LOS conditions (e.g., potential or current misalignments or potential or current obstructions) of the satellite antenna 130-*b*, among other features. The alignment device 505 may be located externally to the satellite antenna 130-*b*, as suggested in FIG. 5, or portions or all of the alignment device 505 may be part of the satellite antenna 130-*b*. For example, the alignment device 505 may be implemented in the subscriber terminal 170, the mobile device 180, or the network device 185 of FIG. 1. In other examples, different components or features of the alignment device 505 may be located in different devices. For example, part of the alignment device 505 (e.g., data storage) may be located in a satellite communication assembly 210 of the satellite antenna 130-*b* while another part is located in the subscriber terminal 170 (e.g., a processor that analyzes the sensor data), and a third part is located in the mobile device 180 (e.g., providing a visual display or auditory information regarding pointing of the satellite antenna 130-*b*). However, for the purposes of discussing FIG. 5, as well as FIGS. 6 and 7, the alignment device 505 is illustrated as a device separate from the satellite antenna 130-*b*.

In FIG. 5, an initial position of the satellite antenna 130-*b* is set (510). This initial position may be set by an installer of the satellite antenna 130-*b*, and may have been assisted using feedback from an LOS sensor. In some examples, the "initial position" may actually be a repositioning of the satellite antenna 130-*b*. In some cases, approval of the initial position of the satellite antenna 130-*b* may be required. For example, the satellite antenna 130-*b* may have to be both aligned and unobstructed before the installation (e.g., initial positioning) is approved. In such a case, the installer may first point the satellite antenna 130-*b* using signal strength (e.g., transmit signal, receive signal, or both). The LOS sensor data may then be used to ensure the LOS condition is unobstructed. In some cases, the LOS sensor data may be sent to a network entity (e.g., network device 185, etc.) for approval of the installation.

After the initial position is set, first sensor data from the LOS sensor may be captured and associated with good LOS conditions (e.g., aligned and unobstructed) (515). That is, once the satellite antenna 130-*b* is determined to be aligned and unobstructed, LOS sensor data is captured as a reference of the known good LOS condition. The satellite antenna 130-*b* may send the first sensor data 520 to the alignment device 505.

Upon receiving the first sensor data 520, the alignment device 505 may store the first sensor data (525). The first sensor data 520 may indicate a first LOS condition of the satellite antenna 130-*b* corresponding to the satellite antenna 130-*b* having a beam contour that is aligned with the target satellite and unobstructed. The alignment device 505 may store the first sensor data 520 as a first LOS condition to be used to compare to LOS sensor data taken at a later time.

At some later time, the satellite antenna 130-*b* captures second sensor data from the LOS sensor (530). The second sensor data may indicate a second LOS condition of the satellite antenna 130-*b*. The time the satellite antenna 130-*b* determines to capture the second sensor data may be based on one or more events. For example, the satellite antenna 130-*b* may capture the second sensor data once a predetermined time period has elapsed from the capturing of the first sensor data. In another example, the satellite antenna 130-*b* captures the second sensor data because the satellite antenna 130-*b* is experiencing a reduced signal quality. In yet another example, the satellite antenna 130-*b* captures the second sensor data in response to an instruction to capture the second sensor data (e.g., from the alignment device 505 or network device 185, etc.). In other examples, the satellite antenna 130-*b* may capture the second sensor data for other reasons. Regardless of what triggered the satellite antenna 130-*b* to capture the second sensor data, the satellite antenna 130-*b* forwards the second sensor data 535 to the alignment device 505.

Upon receiving the second sensor data 535, the alignment device 505 compares the LOS condition shown in the second sensor data to the LOS condition shown in the first sensor data (540). In some examples, the comparison may include comparing the positions of a particular reference feature found in both the first sensor data and the second sensor data. Based on position changes of reference features, the alignment device 505 can determine that the satellite antenna 130-*b* may have become misaligned or obstructed. The comparison may be based on multiple reference features, and determining whether the satellite antenna or a reference feature has moved may be based on a comparison of multiple reference features or the type of reference feature. For example, the processing may detect different outline shapes or sharpness, and may determine that, for example, sharply outlined features (e.g., buildings, etc.) are more likely to be static than reference features that have a softer outline.

Additionally or alternatively, the alignment device 505 may compare the second sensor data to a reference map of celestial bodies, such as a sky map. The alignment device 505 may identify a celestial body that is in the second sensor data and find where on the sky map that celestial body is. The alignment device 505 may calculate a position of the celestial body from the location of the satellite antenna. From a comparison between the second sensor data and the sky map, the alignment device 505 may determine at least one of an elevation angle, an azimuth angle, a latitude, or a longitude of the satellite antenna based at least in part on the comparison of the positions of the celestial body. In some examples, if the latitude and longitude of the satellite antenna position is known or can be determined from the sky map, then the alignment device 505 may determine the elevation angle and azimuth to determine whether the satellite antenna is aligned with the satellite.

Returning to the specific example of FIG. 5, the alignment device 505 may determine an LOS condition change based at least in part on the comparison of the second sensor data to the first sensor data (545). For example, the alignment device 505 may determine a misalignment or obstruction of the satellite antenna with the satellite based on the second LOS condition deviating from the first LOS condition. For example, the alignment device 505 may receive first LOS sensor data of the FOV 405 of FIG. 4A and the second LOS sensor data of the FOV 405-*a* of FIG. 4B. Based on a comparison of the LOS sensor data of FOV 405-*a* and FOV 405, the alignment device 505 may determine that the satellite antenna is misaligned. In another example, the alignment device 505 may receive first LOS sensor data of the FOV 405 of FIG. 4A and the second LOS sensor data of the FOV 405-*d* of FIG. 4E. Based on a comparison of the LOS sensor data of FOV 405-*e* and FOV 405, the alignment device 505 may determine that the satellite antenna is obstructed by tree 415-*a*.

In some examples, the process 500 may include capturing a series of LOS sensor data and comparing the series of captured LOS sensor data to each other or to the first LOS sensor data. The alignment device 505 may determine, from the series of captured sensor data, that the satellite antenna is experiencing pointing fluctuations (e.g., jittering). For example, the satellite antenna may be moving back and forth due to strong wind. The alignment device 505 may determine that the satellite antenna has fluctuating pointing direction by comparing the series of captured images to each other and detecting the small changes in the FOV between the images (e.g., based on reference features in the FOV, etc.). The alignment device 505 may use fast pixel map processing techniques to detect the jittering motion of the satellite antenna. In this example, the alignment device 505 may perform evaluation based on real-time data (e.g., video frame rate, etc.) from the LOS of the satellite antenna to detect the fluctuations. The alignment device 505 may output a warning that the structural support or adjustment features of the antenna support should be secured. In some examples, the alignment device 505 may externally verify the customer location is experiencing wind, for example, by querying a weather report or weather station. During an initial installation or repositioning, the alignment device 505 may adjust a pass/fail criteria for approval of an installation of the satellite antenna at the customer location based on the determined wind.

Figure 6:
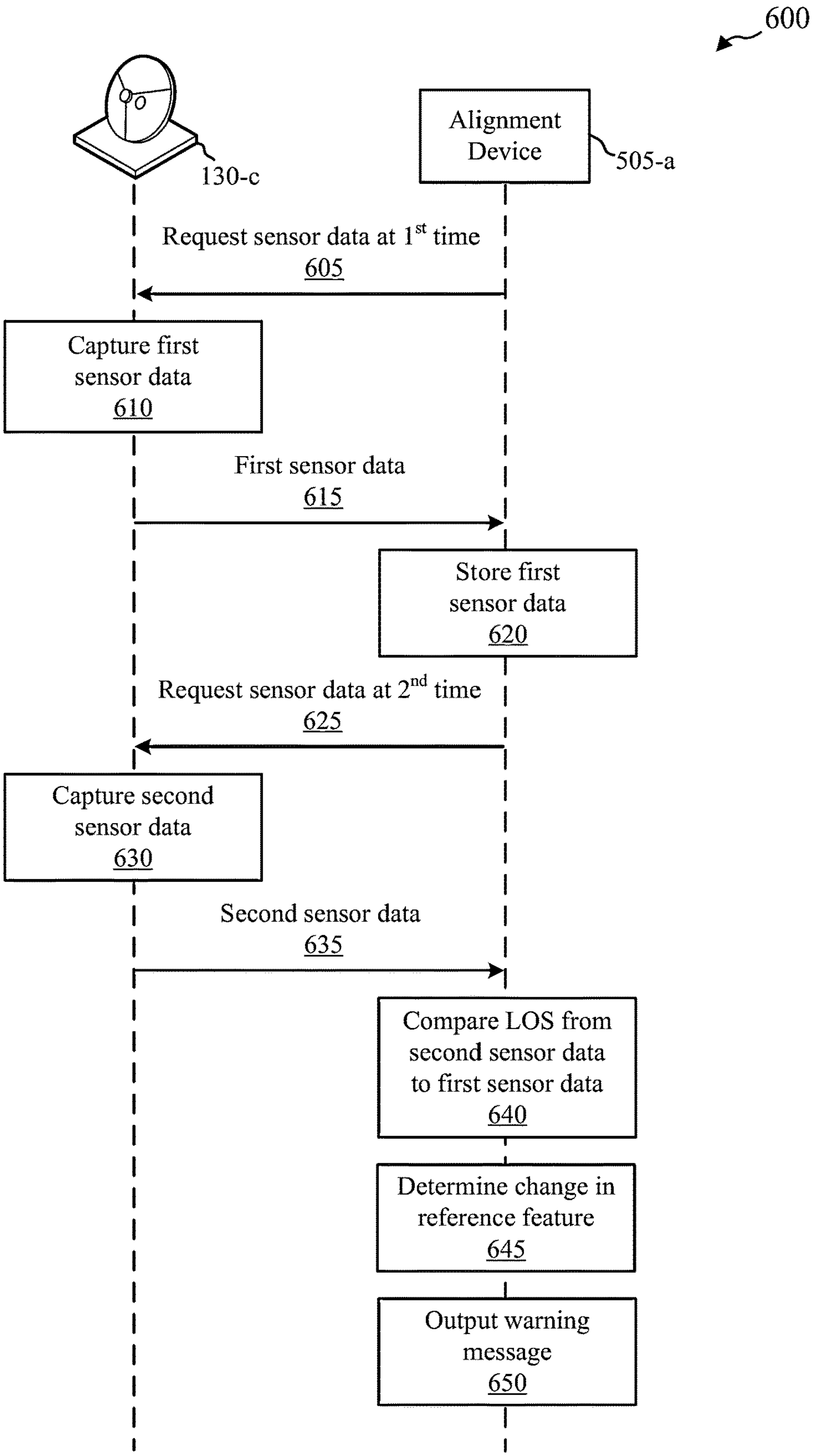
FIG. 6 is a flow diagram illustrating another process of determining a LOS condition change in accordance with various aspects of the disclosure.

FIG. 6 is a flow diagram illustrating another process 600 of determining an LOS condition change in accordance with various aspects of the disclosure. The process 600 includes communication between a satellite antenna 130-*c* and an alignment device 505-*a*. The satellite antenna 130-*c* may be an example of aspects of the satellite antenna 130 described with reference to FIGS. 1, 2A-2B, 3, and 5. The alignment device 505-*a* may be an example of aspects of the alignment device 505 described with reference to FIG. 5.

The alignment device 505-*a* may request first sensor data at a first time from the satellite antenna 130-*c* in a request message 605. The satellite antenna 130-*c* may capture first LOS sensor data in response to the request message 605 (610). The first LOS sensor data may indicate an LOS condition of the satellite antenna 130-*c*. The satellite antenna 130-*c* may send the first sensor data 615 to the alignment device 505-*a*. Upon receiving the first sensor data 615, the alignment device 505-*a* may store the first sensor data (620).

The alignment device 505-*a* may request second sensor data at a second time using a request message 625. The second time may be any time after the first time, including, for example, days, weeks, months, or years later. The alignment device 505-*a* may request the second sensor data because, for example, it received a reduced signal quality report for the satellite antenna 130-*c*, a predetermined time period to check the LOS sensor data has expired, or for another reason. The satellite antenna 130-*c* may capture the second sensor data from the LOS sensor (630). The second sensor data may indicate a second LOS condition of the satellite antenna 130-*c*. The satellite antenna 130-*c* may forward the second sensor data 635 to the alignment device 505.

Upon receiving the second sensor data, the alignment device 505-*a* may compare the LOS of the second sensor data to the LOS of the first sensor data (640). The alignment device 505-*a* may determine, at least partially based on the comparison, that there has been a change in position of a particular reference feature found in both the first sensor data and the second sensor data (645).

Based on detecting the position change, the alignment device 505-*a* can determine that the satellite antenna 130-*c* may have become misaligned or obstructed. In response, the alignment device 505-*a* may output a warning message (650). The warning message may be sent to a subscriber terminal, a mobile device, a gateway, or a network device, for example. The warning message may take any form, such as an auditory warning, a visual warning (such as on a display or an indicator light of a CPE or subscriber terminal), a text message, an email, or by any other means of notifying someone that the satellite 130-*c* is no longer aligned, or may soon be no longer aligned, with a target satellite.

Figure 7:
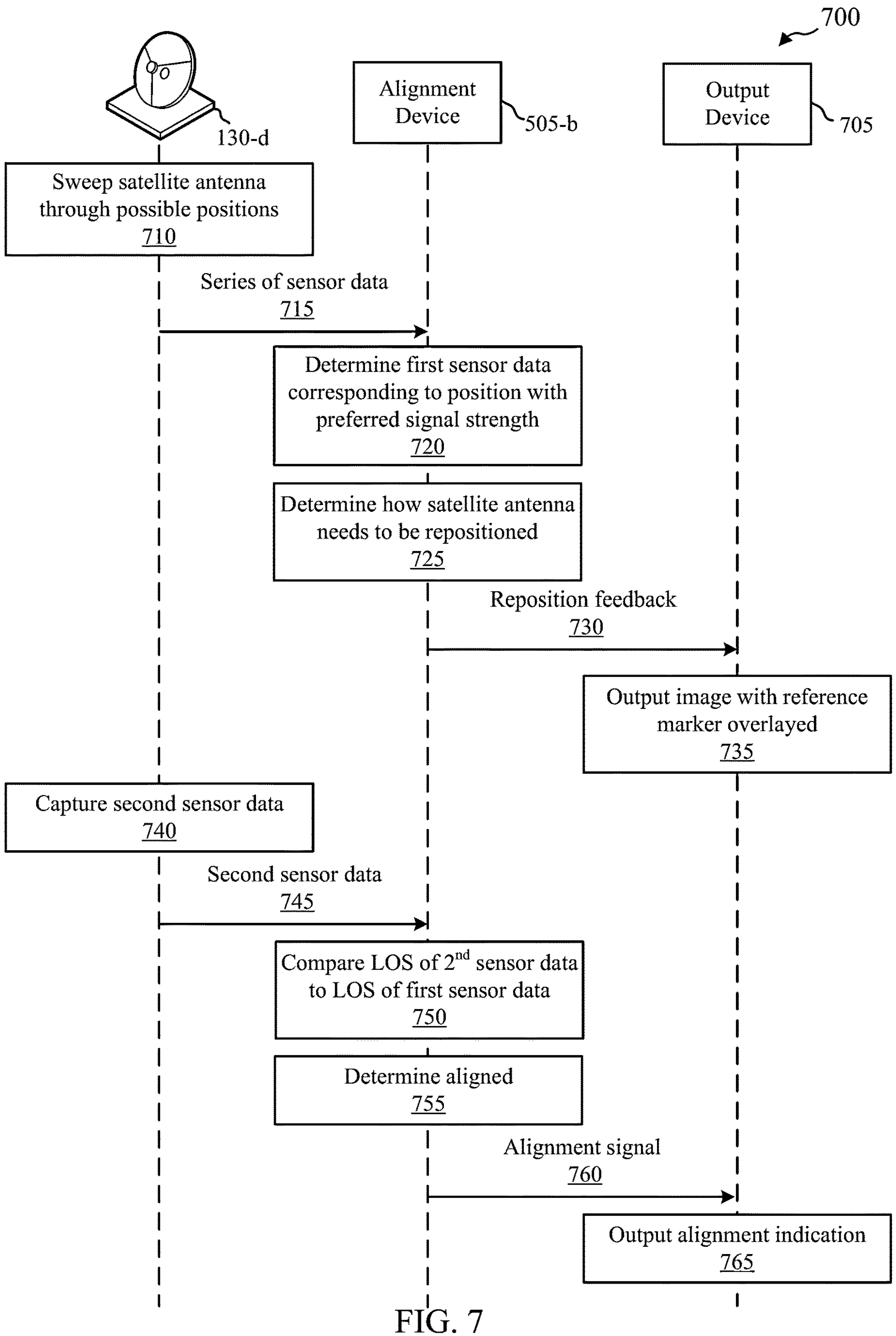
FIG. 7 is a flow diagram illustrating a process of aligning a satellite antenna in accordance with various aspects of the disclosure.

FIG. 7 is a flow diagram illustrating a process 700 of aligning a satellite antenna in accordance with various aspects of the disclosure. The process 700 includes communication between a satellite antenna 130-*d* and an alignment device 505-*b*. The satellite antenna 130-*d* may be an example of aspects of the satellite antennas 130 described with reference to FIGS. 1, 2A-2B, 3, 5, and 6. The alignment device 505-*b* may be an example of aspects of the alignment devices 505 described with reference to FIGS. 5 and 6.

In the process 700, an installer may begin aligning the satellite antenna 130-*d* by sweeping the satellite antenna through a range of possible positions (710). The installer may be setting up an initial installation of the satellite antenna 130-*d*. In another example, the installer may be repositioning the satellite antenna 130-*d* after it became misaligned. Because the installer is present at the satellite antenna 130-*d*, this may be a "truck roll" where personnel has been sent to the site of the satellite antenna 130-*d* to install it or correct an alignment problem. In this example, the sensor data may have been used to confirm the satellite antenna 130-*d* is not obstructed (e.g., a customer may be able to correct an obstruction without requiring a truck roll). In other examples, a user is installing the satellite antenna 130-*d* or correcting a misalignment of the satellite antenna 130-*d*. The user may have been warned by the alignment device 505-*b* that the satellite antenna 130-*d* is misaligned. For simplicity, FIG. 7 is discussed in terms of an setting up an initial installation of the satellite antenna 130-*d*.

The satellite antenna 130-*d* may receive an alignment signal indicating that an alignment process is being performed for the satellite antenna. The installer may sweep the satellite antenna 130-*d* (e.g., in azimuth or elevation) through one or more possible positions close to where the installer believes the satellite antenna would have a beam that is unobstructed and aligned with the target satellite. During the sweep, signal reception strengths of a signal transmitted by the target satellite may be recorded. This initial position may be a coarse positioning based on, for example, where the installer thinks the target satellite is in the sky. The satellite antenna 130-*d* may capture a series of LOS sensor data throughout the sweep and send a message 715 providing the series of LOS sensor data to the alignment device 505-*b*. That is, the satellite antenna 130-*d* may transmit a series of captured sensor data during the alignment process 715 to the alignment device 505-*b*.

The alignment device 505-*b* may determine which LOS sensor data corresponds with a preferred signal strength received at the satellite antenna (720). For example, the alignment device 505-*b* may select the LOS sensor data that was captured at the moment with the highest forward link or return link signal strength. This LOS sensor data may correspond to a good LOS condition (e.g., aligned and unobstructed) and may be considered the first LOS sensor data. If the latest or current LOS sensor data from the satellite antenna 130-*d* does not correspond with the first LOS sensor data, the alignment device 505-*b* may determine how the satellite antenna 130-*d* needs to be repositioned in order to position the satellite antenna 130-*d* such that it is pointed as it was when the first LOS sensor data was captured (725).

The alignment device 505-*b* sends repositioning feedback 730 to an output device 705. The output device 705 may be, for example, a mobile device such as the mobile device 180 of FIG. 1. The installer may have access to the output device 705 during the alignment process. Using the reposition feedback 730, the output device 705 may display an image with a reference marker overlayed on the image (735). The image may correspond to a current image of the FOV of the LOS sensor data, for example. The reference marker may be, for example, an x indicating the position of satellite 105-*b* of FIGS. 4A-4D and 4F. The reference marker may indicate to the installer where to position the satellite antenna 130-*d*. In some examples, the output device 705 outputs a series of images from the LOS sensor with at least one reference marker overlayed on the series of images. The series of images may be captured at the satellite antenna 130-*d* as the installer repositions the satellite antenna 130-*d*.

The installer may reposition the satellite antenna 130-*d* based on the output image. For example, the installer may move the satellite antenna 130-*d* in a direction or way indicated by the reference marker. In some examples, the satellite antenna 130-*d* has mechanical features, such as servomechanisms, that enable the satellite antenna 130-*d* to automatically reposition itself based on the feedback 730.

Once repositioned, the satellite antenna 130-*d* captures second sensor data corresponding to the new position of the satellite antenna 130-*d* (740). The satellite antenna 130-*a* may send the second sensor data 745 to the alignment device 505-*b*. The alignment device 505-*b* may compare a position of the main beam of the satellite antenna 130-*d* in the second sensor data to the position of the main beam in the first LOS sensor data (750). In some examples, the alignment device 505-*a* may use reference features (e.g., buildings, trees, etc.) in the FOV from the LOS sensor to determine the current position of the target satellite in the second sensor data. If the beam LOS deviates from the target satellite position more than a threshold amount, the alignment device 505-*b* may continue to provide feedback to the output device 705 and receive additional sensor data until the alignment device 505-*b* determines that the beam LOS of the satellite antenna 130-*d* is properly aligned with the target satellite. If, however, as is illustrated in FIG. 7, the main beam of the satellite antenna is determined to be aligned with the satellite position within a threshold amount, the alignment device 505-*b* may determine that good LOS conditions for the satellite antenna 130-*d* has been achieved (755). The alignment device 505-*b* may output an alignment signal (760). The output device may output the alignment indication so that the installer or the satellite device 130-*d* knows that the satellite device 130-*d* is properly aligned (765).

If a weather event is detected during installation or repositioning of the satellite antenna, the alignment device 505-*b* may adjust a pass/fail criteria for approval of an installation of the satellite antenna at the customer location based on the determined weather event. For example, an installation may be deemed to be acceptable based on signal quality (e.g., signal-to-noise ratio (SNR), etc.) between the satellite antenna 130-*d* and the satellite. If a storm is occurring between the satellite antenna 130-*d* and the satellite, the signal quality may be degraded even when the satellite antenna 130-*d* has an aligned and unobstructed (by local objects) beam LOS. Thus, an otherwise good antenna positioning may fail installation criteria because of the storm. Detection of the storm may be made by automatic detection of sky color or sky temperature in the LOS sensor data, and the pass/fail criteria may be adjusted to account for the degradation in signal quality as a result of the storm.

Figure 8:
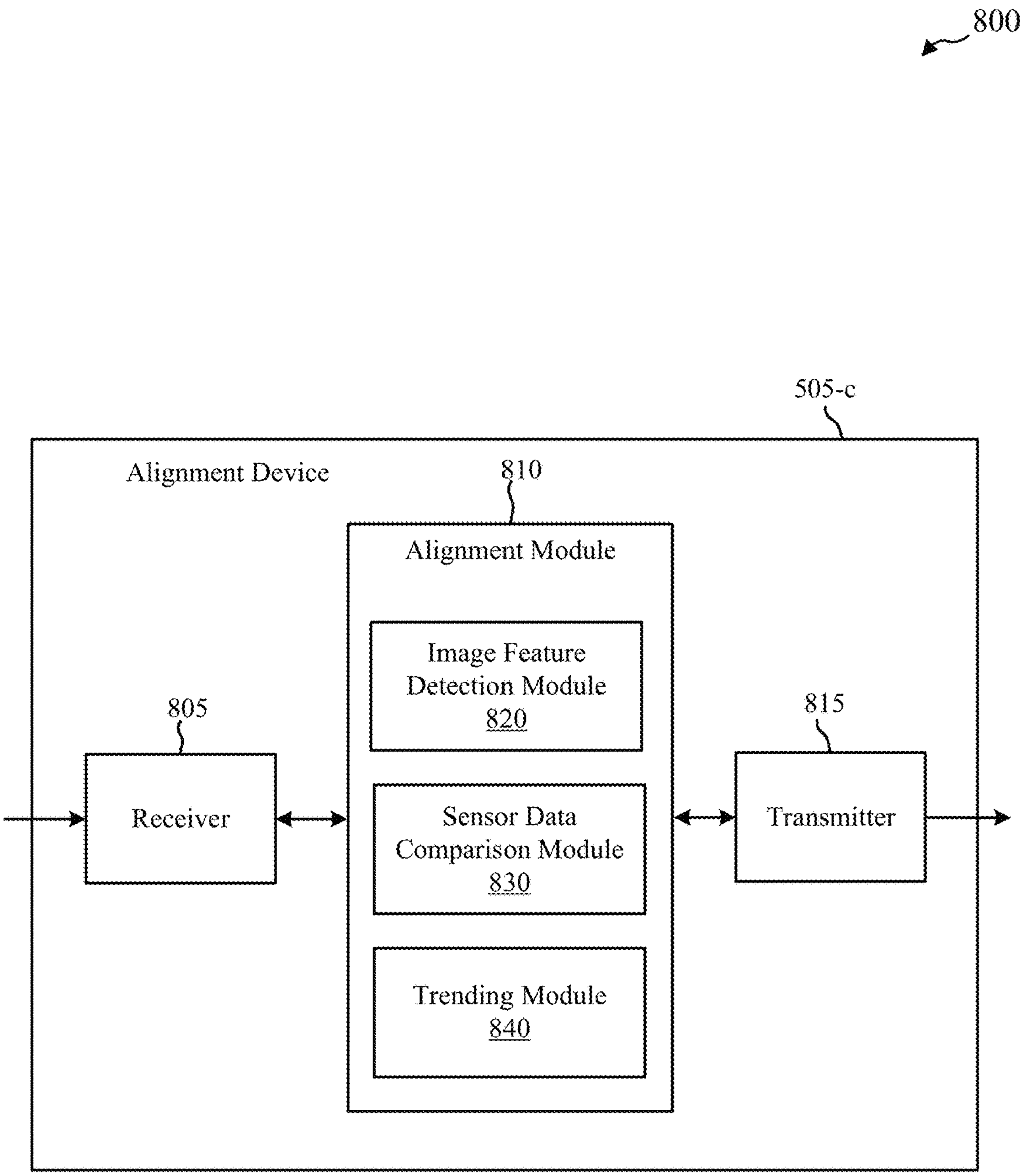
FIG. 8 shows a block diagram of an alignment device in accordance with various aspects of the disclosure.

FIG. 8 shows a block diagram 800 of an alignment device 505-*c* in accordance with various aspects of the disclosure. The device 505-*c* may be an example of aspects of an alignment device 505 described with reference to FIGS. 5-7. The alignment device 505-*c* may include a receiver 805, an alignment module 810, and a transmitter 815. The alignment device 505-*c* may also be or include a processor. Each of these components may be in communication with each other.

The alignment device 505-*c*, through the receiver 805, the alignment module 810, or the transmitter 815, may be configured to perform the functions described herein. For example, the alignment device 505-*c* may be configured to determine a misalignment or obstruction of a satellite antenna, issue a warning message for a potential misalignment or obstruction, and assist with positioning the satellite antenna.

The receiver 805 may receive information such as packets, user data, or control information associated with a satellite antenna, such as LOS sensor data, signal quality data, or the like. The receiver 805 may be configured to receive LOS sensor data from the satellite antenna. Information may be passed on to the alignment module 810 and to other components of the alignment device 505-*c*.

The alignment module 810 may include an image feature detection module 820, a sensor data comparison module 830, and a trending module 840. The alignment module 810 may receive LOS sensor data from the satellite antenna. The image feature detection module 820 may process the LOS sensor data to identify one or more reference features in the FOV of the LOS sensor. The reference features may be objects, buildings, celestial bodies, or any other feature with a predictable and mostly stable location. In some examples, the LOS sensor data being an optical image may allow a pixel-by-pixel comparison of the LOS sensor data to previous stored LOS sensor data.

The sensor data comparison module 830 may compare previously stored LOS sensor data with current LOS sensor data to determine if a misalignment or obstruction has occurred. For example, the sensor data comparison module 830 may compare LOS sensor data from good LOS conditions with second LOS sensor data, or with a series of LOS sensor data. If the sensor data comparison module 830 determines that there is a change above a threshold amount in position of a reference feature identified by the image feature detection module 820, the alignment device may determine that there is a misalignment or obstruction.

The trending module 840 may detect any trend in the satellite antenna becoming misaligned or obstructed. For example, the trending module 840 may determine, based on comparison information from the sensor data comparison module 830, that a tree is steadily growing towards the main beam of the satellite antenna. In another example, the trending module 840 may detect that satellite antenna elevation is beginning to sag, which may eventually bring the satellite antenna out of alignment. For example, the trending module 840 may compare first LOS sensor data of the FOV 405 of FIG. 4A and the second LOS sensor data of the FOV 405-*e* of FIG. 4E. Based on a comparison of the LOS sensor data, the trending module 840 may determine that the beam contour 410-*e* may eventually be obstructed, as the tree 415-*b* grows. Based on the rate of growth of tree 415-*b*, the trending module 840 may determine a time period before the beam contour 410-*e* becomes obstructed.

In some examples, the satellite antenna may already be determined to be misaligned, but because it so far has not resulted in significant performance degradation, the satellite antenna has not yet been repositioned. The trending module 840 may determine when it may be likely that the performance of the satellite antenna is significantly degraded to warrant action.

The transmitter 815 may transmit signals received from other components of the alignment device 505-*c*. The transmitter 815 may transmit data to another component of a satellite communication system. The transmitter 815 may output a warning signal to indicate the satellite antenna is misaligned or obstructed. The transmitter 815 may also output a signal to indicate that the satellite antenna has good LOS conditions. In some examples, the transmitter 815 may be collocated with the receiver 805 in a transceiver.

Figure 9:
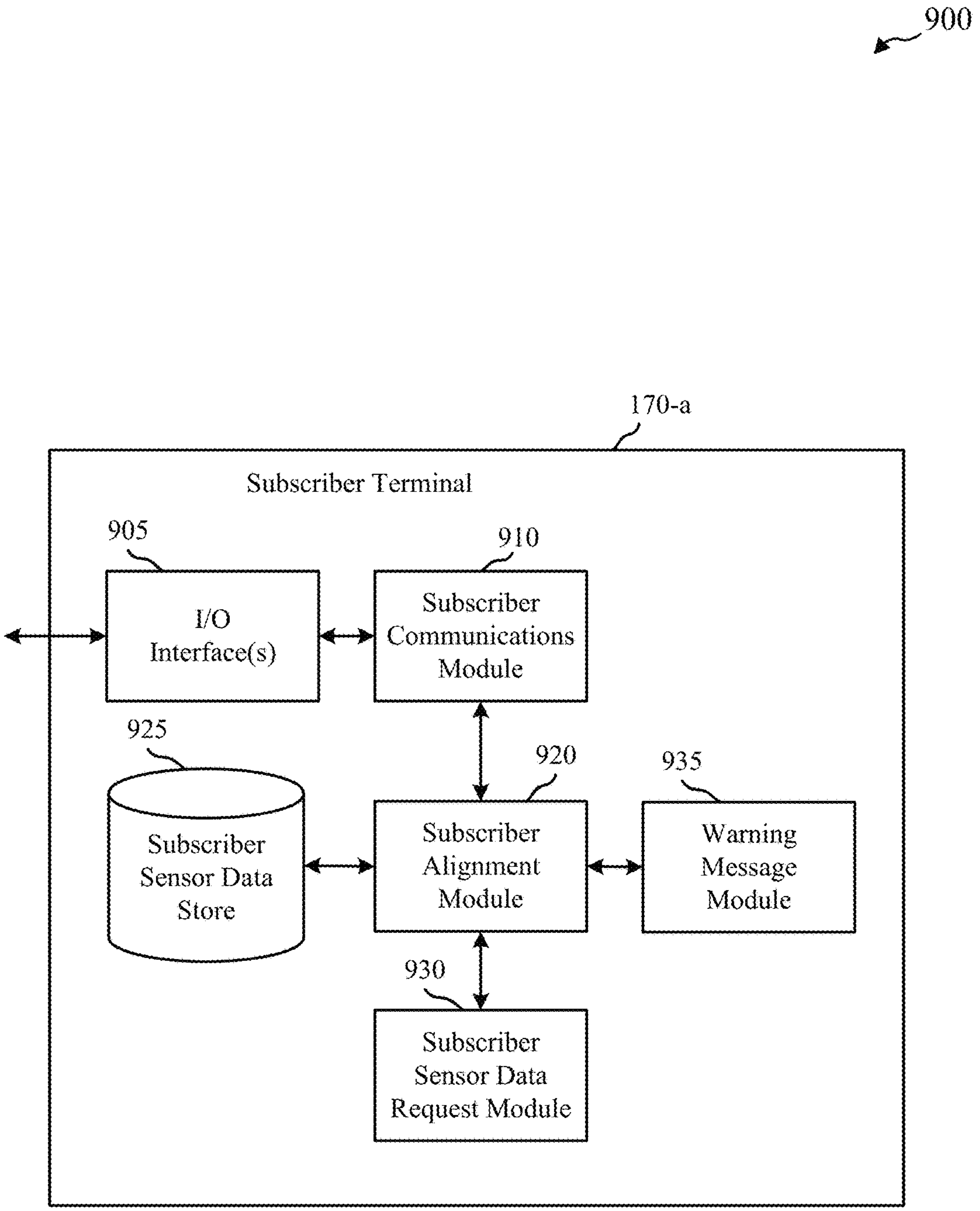
FIG. 9 shows a block diagram of a subscriber terminal in accordance with various aspects of the disclosure.

FIG. 9 shows a block diagram 900 of a subscriber terminal 170-*a* in accordance with various aspects of the disclosure. The subscriber terminal 170-*a* may be an example of aspects of a subscriber terminal 170 described with reference to FIG. 1. The subscriber terminal 170-*a* may include an input/output (I/O) interface 905, a subscriber communications module 910, a subscriber alignment module 920, a subscriber sensor data request module 930, a warning message module 935, and a subscriber sensor data store 925. Each of these components may be in communication with each other.

The subscriber terminal 170-*a* may be configured to perform functions described herein. For example, the subscriber terminal 170-*a* may be configured to determine a misalignment or obstruction of a satellite antenna, issue a warning message for a potential misalignment or obstruction, and assist with positioning the satellite antenna. In one example, the subscriber alignment module 920 includes functionality of the alignment device 505-*c* of FIG. 8.

The I/O interface 905 may receive information such as packets, user data, or control information associated with a satellite antenna, such as LOS sensor data, signal quality data, or the like. The I/O interface 905 may be configured to receive LOS sensor data from the satellite antenna. Information may be passed on to the other components of the subscriber terminal 170-*a*. The I/O interface 905 may also send signals received from other components of the subscriber terminal 170-*a* to external devices, such as a network device or a mobile device. The I/O interface 905 may transmit data to another component of the satellite communication system. The I/O interface 905 may output warning signals generated by the warning message module 935 to indicate the satellite antenna is misaligned. The I/O interface 905 may also output a signal to indicate that the satellite antenna is in good alignment and unobstructed.

The subscriber communications module 910 may manage communications between the subscriber terminal 170-*a* and other components of the satellite communication system. The subscriber alignment module 920 may be an example of one or more aspects of the alignment module 810 of FIG. 8. The subscriber alignment module 920 may process LOS sensor data, including detecting reference features, comparing LOS sensor data, trending LOS sensor data, and the like. In another example, the subscriber communications module 910 includes functionality or components of the alignment device 505-*c*. The subscriber alignment module 920 may retrieve stored sensor data or sky maps from the subscriber sensor data store 925. The subscriber alignment module 920 may also cause additional LOS sensor data to be stored at the subscriber sensor data store 925.

The subscriber sensor data request module 930 may generate requests for LOS sensor data from the satellite antenna. The subscriber sensor data request module 930 may request sensor data based on a periodic check or in response to something triggering checking the sensor data (e.g., reduced performance of the satellite antenna, an accelerometer of the satellite antenna detecting a sudden acceleration, etc.).

The warning message module 935 may generate a warning signal to be outputted based on a current misalignment or obstruction or a potential misalignment or obstruction detected by the subscriber alignment module 920. The warning message module 935 may provide the warning message to the I/O interface 905, which may output the warning message. In another example, the I/O interface 905 sends the warning message to a user device (such as the mobile device 180), which outputs the warning message.

Figure 10:
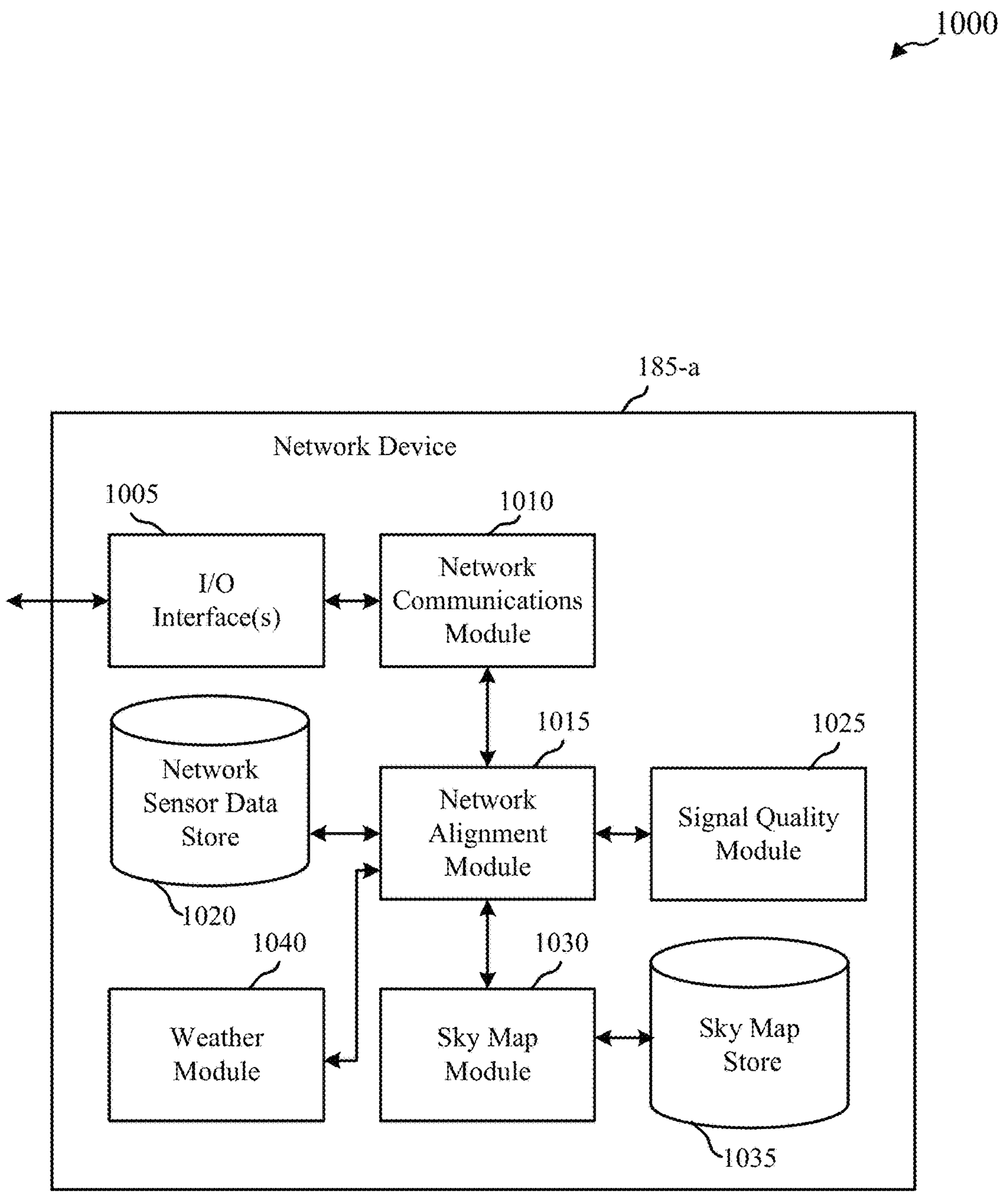
FIG. 10 shows a block diagram of a network device in accordance with various aspects of the disclosure.

FIG. 10 shows a block diagram 1000 of a network device 185-*a* in accordance with various aspects of the disclosure. The network device 185-*a* may be an example of aspects of a network device 185 described with reference to FIG. 1. The network device 185-*a* may include an I/O interface 1005, a network communications module 1010, a network alignment module 1015, a network sensor data store 1020, a signal quality module 1025, a weather module 1040, a sky map module 1030, and a sky map store 1035. Each of these components may be in communication with each other.

The network device 185-*a* may be configured to perform functions described herein. For example, the network device 185-*a* may be configured to determine a misalignment or obstruction of a satellite antenna, issue a warning for a potential misalignment or obstruction, and assist with positioning the satellite antenna. In one example, the network device 185-*a* includes the alignment device 505-*c* of FIG. 8. In another example, the network device 185-*a* includes a part of the alignment device 505-*c*.

The I/O interface 1005 may receive information such as packets, user data, or control information associated with a satellite antenna, such as LOS sensor data, signal quality data, or the like. The I/O interface 1005 may be configured to receive LOS sensor data from the satellite antenna. Information may be passed on to the other components of the network device 185-*a*. The I/O interface 1005 may also send signals received from other components of the network device 185-*a* to external devices, such as a subscriber terminal or a mobile device. The I/O interface 1005 may transmit data to another component of the satellite communication system. The I/O interface 1005 may output warning messages generated by the network alignment module 1015 to indicate the satellite antenna is misaligned. The I/O interface 1005 may also output a signal to indicate that the satellite antenna has good LOS conditions.

The network communications module 1010 may manage communications between the network device 185-*a* and other components of the satellite communication system. The network alignment module 1015 may be an example of one or more aspects of the alignment module 810 of FIG. 8. The network alignment module 1015 may process LOS sensor data, including detecting reference features, comparing LOS sensor data, trending LOS sensor data, and the like. The network alignment module 1015 may retrieve stored sensor data from the network sensor data store 1020. The network alignment module 1015 may also cause additional LOS sensor data to be stored at the network sensor data store 1020. The network alignment module 1015 may be notified by the signal quality monitor 1025 when the performance of the satellite antenna has degraded such that the network alignment module 1015 should check the LOS of the satellite antenna. The signal quality module 1025 may monitor the performance of the satellite antenna.

The network alignment module 1015 may also communicate with the weather module 1040. The weather module 1040 may assist in determining when a weather event is ongoing. For example, the signal quality module 1025 may determine that the satellite antenna performance is degraded at a particular time. The network alignment module 1015 may request LOS sensor data for that time. The weather module 1040 may review the LOS sensor data and can determine that a weather event is occurring. That is, the weather module 1040 may determine, based on captured sensor data from the LOS sensor, that a weather event is occurring between a customer location of the satellite antenna and the satellite. In some examples, determining that a weather event is occurring is based on a sky color from a visible spectrum image or sky temperature from an infrared LOS sensor. If it appears from the LOS sensor data that the LOS condition includes a weather event, the weather module 1040 may determine whether the degraded performance is due to a storm. If so, the network alignment module 1015 may delay sending a warning message since the degraded performance may be explained by the storm. The network alignment module 1015 may request LOS sensor data at a later time, if the signal quality module 1025 continues to show reduced signal quality. If a weather event is detected during installation or repositioning of the satellite antenna, the weather module 1040 may adjust a pass/fail criteria for approval of an installation of the satellite antenna at the customer location based on the determined weather event.

The network alignment module 1015 may also communicate with the sky map module 1030. In some examples, one or more images from the LOS sensor may include a celestial body. If so, the sky map module 1030 may retrieve a sky map associated with an estimated position of the satellite antenna and time from the sky map store 1035. The sky map module 1030 may identify the celestial body in the retrieved sky map and compare a position of the celestial body in the LOS sensor data to a position of the celestial body in the sky map. The sky map module 1030 may determine at least one of an elevation angle, an azimuth angle, a latitude, or a longitude of the satellite antenna based at least in part on the comparison of the positions of the celestial body.

Figure 11:
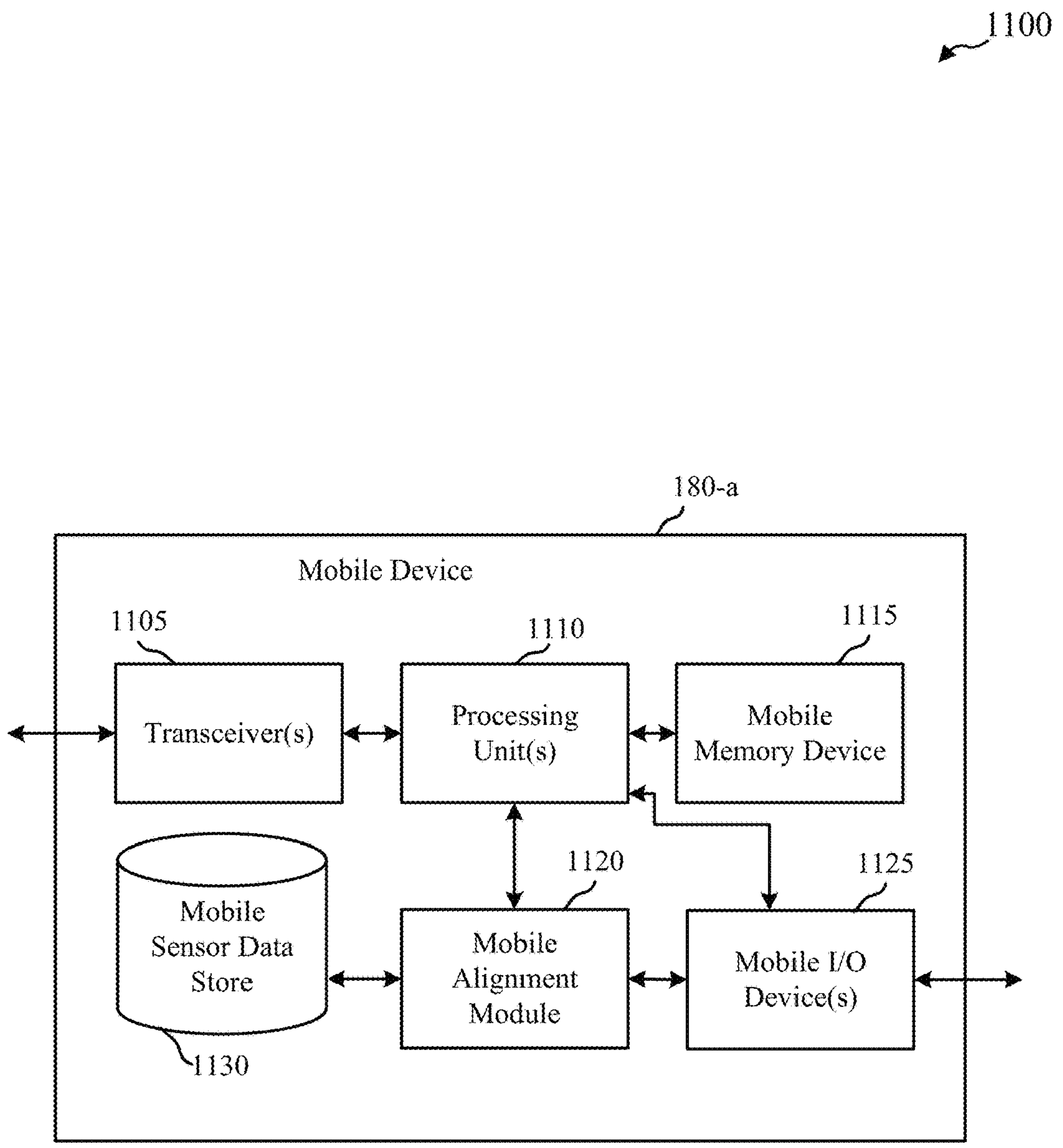
FIG. 11 shows a block diagram of a mobile device in accordance with various aspects of the disclosure.

FIG. 11 shows a block diagram 1100 of a mobile device 180-*a* in accordance with various aspects of the disclosure. The mobile device 180-*a* may be an example of aspects of a mobile device 180 described with reference to FIG. 1. The mobile device 180-*a* may include one or more transceivers 1105, one or more processing units 1110, a mobile memory device 1115, one or more mobile input/output (I/O) device 1125, a mobile alignment module 1120, and a mobile sensor data store 1130. Each of these components may be in communication with each other.

The mobile device 180-*a* may be configured to perform functions described herein. For example, the mobile device 180-*a* may be configured to determine a misalignment or obstruction of a satellite antenna, issue a warning message for a potential misalignment or obstruction, and assist with positioning the satellite antenna. In one example, the mobile device 180-*a* includes the functionality of the alignment device 505-*c* of FIG. 8.

The transceiver 1105 may receive information such as packets, user data, or control information associated with a satellite antenna, such as LOS sensor data, signal quality data, or the like. The transceiver 1105 may be configured to receive LOS sensor data from the satellite antenna, which may be routed through another device, such as a subscriber terminal. Information may be passed on to the other components of the mobile device 180-*a*. The transceiver 1105 may also send signals received from other components of the mobile device to external devices, such as a network device or the subscriber terminal. The transceiver 1105 may transmit data to another component of the satellite communication system.

The mobile device 180-*a* may include an alignment application 1115 that may generate information (e.g., images, sounds, etc.) to be outputted to assist a user in an installation or repositioning of the satellite antenna. For example, the mobile alignment module 1120 may provide a series of images of LOS sensor data to the alignment application 1115. The alignment application 1115 may generate an image corresponding to a current position of the satellite antenna with a reference marker overlayed to indicate how the satellite antenna should be repositioned. The alignment application 1115 may cause the mobile 1/O device 1125 to display the image with the reference marker.

The processing unit 1110 may work with the mobile alignment module 1120 to perform the features described herein. The mobile sensor data store 1130 may store LOS sensor data for one or more associated satellite antennas.

The mobile I/O device 1125 may be a speaker, a visual display, a light, or the like. The mobile I/O device 1125 may output warning messages generated by the mobile alignment module 1120 to indicate the satellite antenna is misaligned. The mobile I/O device 1125 may also output a signal to indicate that the satellite antenna is in good alignment.

Figure 12:
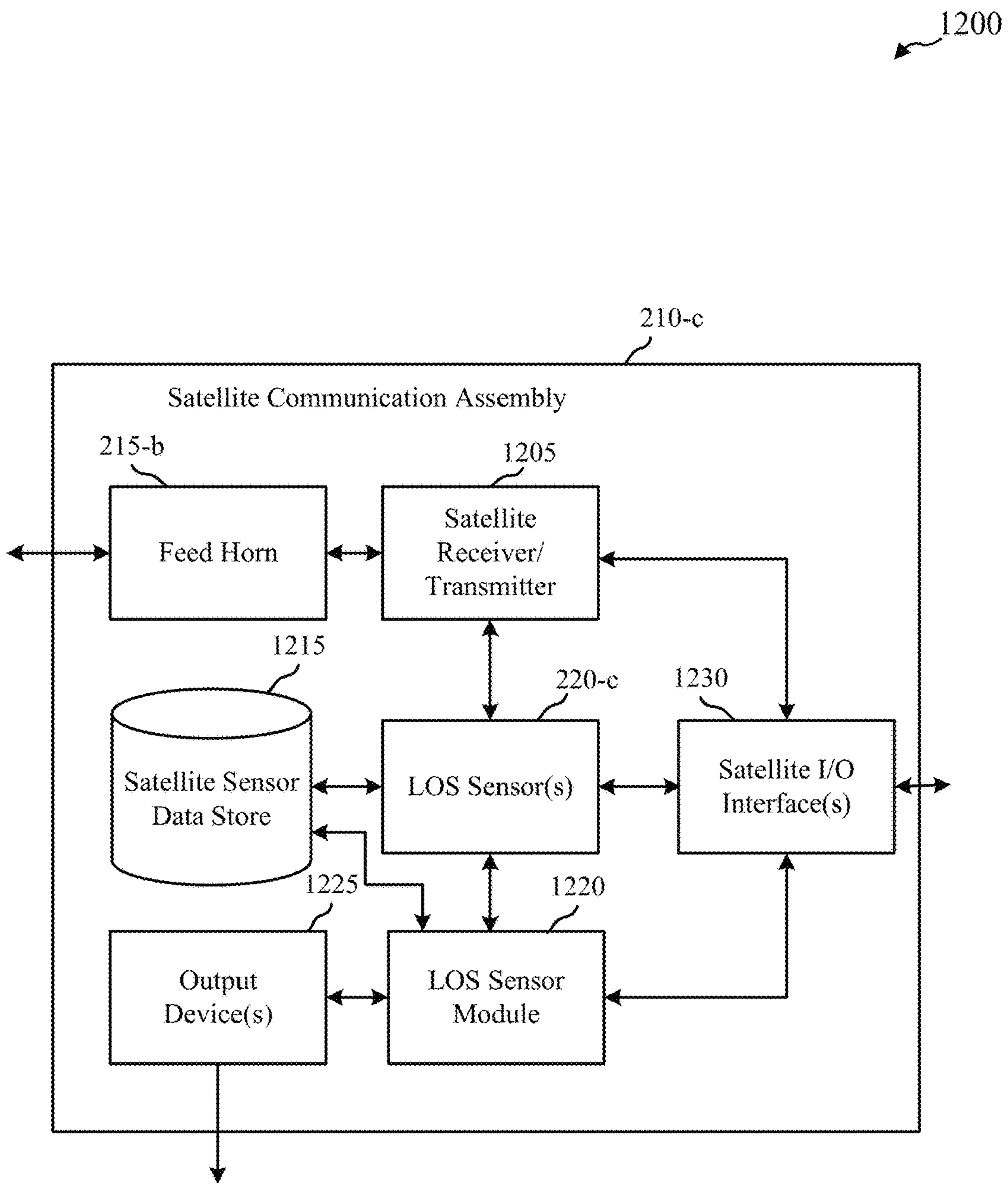
FIG. 12 shows a block diagram of a satellite communication assembly in accordance with various aspects of the disclosure.

FIG. 12 shows a block diagram 1200 of a satellite communication assembly 210-*c* in accordance with various aspects of the disclosure. The satellite communication assembly 210-*c* may be an example of aspects of a satellite communication assembly 210 described with reference to FIGS. 2A, 2B, and 2C. The satellite communication assembly 210-*c* may include a feed horn 215-*b*, a satellite receiver/transmitter 1205, one or more LOS sensors 220-*c*, an LOS sensor module 1220, a satellite sensor data store 1215, one or more satellite I/O interfaces 1230, and one or more output devices 1225. Each of these components may be in communication with each other.

The satellite communication assembly 210-*c* may be configured to perform functions described herein. For example, the satellite communication assembly 210-*c* may be configured to determine a misalignment or obstruction of the satellite antenna, issue a warning message for a potential misalignment or obstruction, and assist with positioning the satellite antenna. In one example, the satellite communication assembly 210-*c* may include the functionality of the alignment device 505-*c* of FIG. 8. However, in other examples, the satellite communication assembly 210-*c* does not include functionality for analyzing LOS sensor data to determine a misalignment or obstruction.

The feed horn 215-*b* may be an example of one or more aspects of a feed horn 215 described with respect to FIGS. 2A, 2B, and 3, and is not discussed further here for brevity. The satellite receiver/transmitter 1205 functions as a transceiver for communications to a satellite.

The satellite communication assembly 210-*c* may include one or more LOS sensors 220-*c*. The LOS sensors 220-*c* may be at least one of an optical image sensor, an infrared sensor, or a radar. The LOS sensors 220-*c* may point in a same direction as a main beam of the satellite receiver/transmitter 1205. The LOS sensors 220-*c* may capture sensor data during an installation, a repositioning, periodically, or when specifically requested. The satellite sensor data store 1215 may store LOS sensor data, including LOS sensor data corresponding to good LOS conditions.

The satellite I/O interface 1230 may be coupled with a subscriber terminal or a CPE. Through the satellite I/O interface 1230, the LOS sensor module 1220 may receive information on signal quality and performance of the satellite antenna, requests for LOS sensor data, warning messages, or the like. The I/O interface 905 may be configured to send LOS sensor data from the satellite antenna to connected components or devices. The I/O interface 1230 may also be used to send signals received from other components of the satellite communication assembly 210-*c* to external devices, such as a network device or a mobile device. The I/O interface 1230 may be used to send data to another component of the satellite communication system.

The output device 1225 may output warning messages generated by the LOS sensor module 1220 to indicate the satellite antenna is misaligned or obstructed. The output device 1225 may also output a signal to indicate that the satellite antenna has good LOS conditions. In another example, the output device 1225 may also output feedback regarding how to correctly reposition the satellite antenna.

The components of the alignment device 505-*c*, the subscriber terminal 170-*a*, the network device 185-*a*, the mobile device 180-*a*, and the satellite communication assembly 210-*c* may, individually or collectively, be implemented using at least one application-specific integrated circuit (ASIC) adapted to perform some or all of the applicable functions in hardware. Alternatively, the functions may be performed by at least one other processing unit (or core), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by general or application-specific processors.

Figure 13:
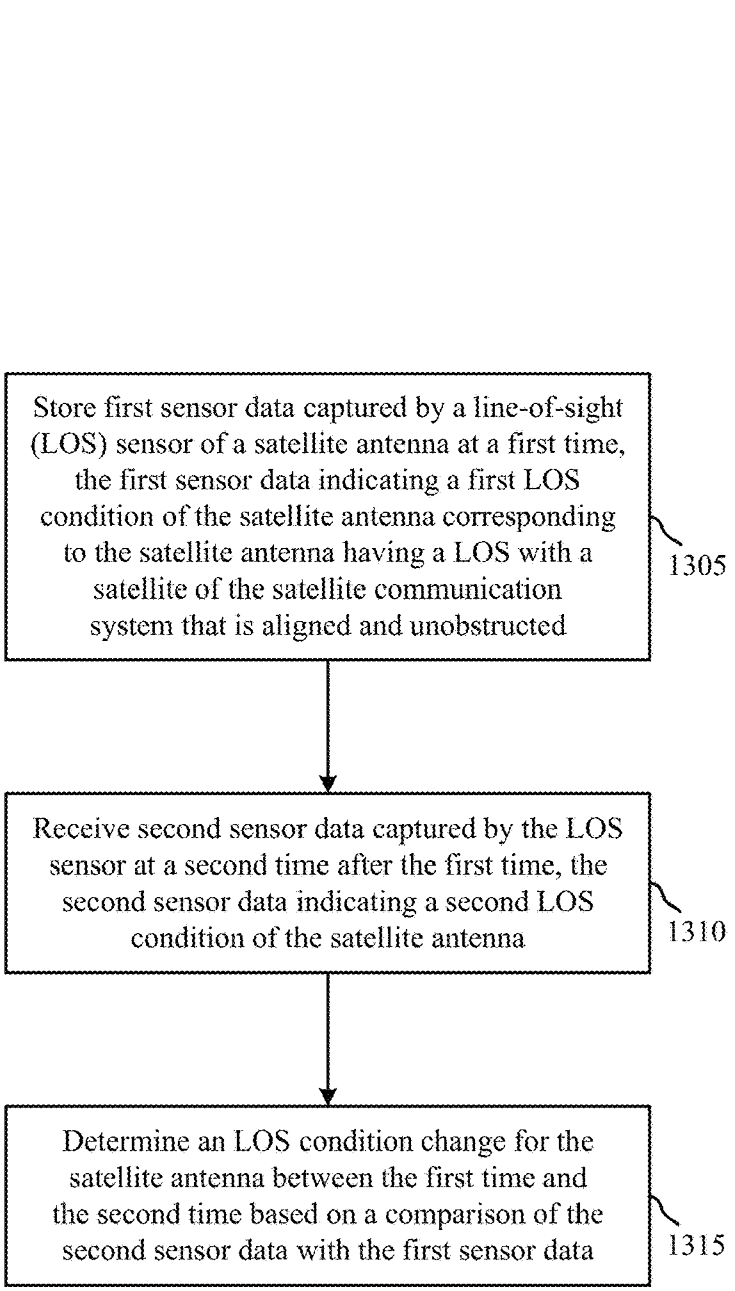
FIG. 13 is a flow chart illustrating an example of a method for use in a satellite communication system in accordance with various aspects of the disclosure.

FIG. 13 is a flow chart illustrating an example of a method 1300 for use in a satellite communication system in accordance with various aspects of the disclosure. For clarity, the method 1300 is described below with reference to aspects of the alignment device 505 described with reference to FIGS. 5-8. In some examples, an alignment device may execute sets of codes to control the functional elements of the alignment device to perform the functions described below. Additionally or alternatively, the alignment device may perform of the functions described below using multi-purpose hardware. In various examples, the functionality of the alignment device may be spread across multiple devices.

The method 1300 may include storing first sensor data captured by an LOS sensor of a satellite antenna at a first time, the first sensor data indicating a first LOS condition of the satellite antenna corresponding to the satellite antenna having a LOS with a satellite of the satellite communication system that is aligned and unobstructed at block 1305. For example, the alignment device may store the first sensor data captured by an LOS sensor 220.

The method 1300 may also include receiving second sensor data captured by the LOS sensor at a second time after the first time, the second sensor data indicating a second LOS condition of the satellite antenna at block 1310. The LOS sensor may include at least one of an optical image sensor, an infrared sensor, or a radar.

The method 1300 may include determining an LOS condition change for the satellite antenna between the first time and the second time based on a comparison of the second sensor data with the first sensor data at block 1315. In some examples, determining the LOS condition change further includes determining a misalignment or obstruction of the satellite antenna with the satellite based on the second LOS condition deviating from the first LOS condition.

In another example, determining the misalignment or obstruction of the satellite antenna includes identifying a reference feature at a first position in the first sensor data, identifying the reference feature at a second position in the second sensor data, and determining the misalignment or obstruction based on a difference between the second position of the reference feature and the first position of the reference feature.

Determining the LOS condition change may also include determining that an object is obstructing the beam LOS with the satellite in the second LOS condition. This may include detecting a position of the object in the second sensor data, wherein the position of the object overlaps with the beam LOS with the satellite.

In some examples, the method 1300 further includes receiving a series of captured sensor data indicating a series of LOS conditions for the satellite antenna captured after the first time. The method 1300 may also include detecting a change over time in antenna position or a location of an object relative to the beam LOS with the satellite based on the series of captured sensor data. Further, the method 1300 may include predicting that the antenna position or the object will cause a performance degradation of the satellite antenna at a future time and issuing a warning message based on the predicted performance degradation of the satellite antenna.

The method 1300 may include determining, from the series of captured sensor data, that a position of the satellite antenna is fluctuating. That is, the satellite antenna may be experiencing irregular or vibratory movements, such as moving back and forth in a strong wind. For example, the satellite antenna may be experiencing excessive wind mispointing. The method 1300 may determine that the satellite antenna is jittering by comparing the series of captured images to each other and detecting the jittering motion from the series of images. The method 1300 may, for example, employ fast pixel map processing techniques to detect the fluctuations. In some examples, the series of images may be captured over a relatively small time, such as over a few seconds. The method 1300 may perform a real-time evaluation of the senor data to detect the jitter. The method 1300 may issue a warning that the satellite antenna is not secured properly. In other examples, the method 1300 may adjust a pass/fail criteria for approval of an installation of the satellite antenna at the customer location based on the determined wind or other weather event.

The method 1300 may also include receiving, at the satellite antenna, an alignment signal indicating an alignment process is being performed for the satellite antenna. The method 1300 may include transmitting a series of captured sensor data during the alignment process. The series of captured sensor data may include a series of images from the LOS sensor with at least one reference marker overlayed on the series of images.

In some examples, receiving the second sensor data further includes receiving one or more images from the LOS sensor at the second time, wherein the one or more images include a celestial body. The method 1300 may include retrieving a sky map associated with an estimated position of the satellite antenna and time and identifying the celestial body in the sky map. The method 1300 may include comparing a position of the celestial body in the second sensor data to a position of the celestial body in the sky map. In some examples, the method 1300 may include determining at least one of an elevation angle, an azimuth angle, a latitude, or a longitude of the satellite antenna based at least in part on the comparison of the positions of the celestial body.

In some examples, the method 1300 may include determining, based on captured sensor data from the LOS sensor, that a weather event is occurring between a customer location of the satellite antenna and the satellite. The method 1300 may further include adjusting a pass/fail criteria for approval of an installation of the satellite antenna at the customer location based on the determined weather event. The method 1300 may also include determining that the weather event is occurring is based on a sky temperature from the infrared sensor, wherein the LOS sensor is an infrared sensor.

Examples of the method 1300 may further include periodically capturing, at the satellite antenna, sensor data from the LOS sensor and comparing the periodically captured sensor data with the first sensor data. The method 1300 may include triggering sending the second sensor data to a network operations center associated with the satellite communication system in response to detecting a difference in the periodically captured sensor data with the first sensor data.

In additional examples, the method 1300 may include receiving an indication of reduced signal quality for communications between the satellite antenna and the satellite. The method 1300 may also include triggering a capturing of the second sensor data by the LOS sensor in response to receiving the indication of reduced signal quality.

The operation(s) at blocks 1305-1315 may be performed using the alignment device described with reference to FIGS. 5-8. Thus, the method 1300 may be for use in a satellite communication system. It should be noted that the method 1300 is just one implementation and that the operations of the method 1300 may be rearranged or otherwise modified such that other implementations are possible.

Figure 14:
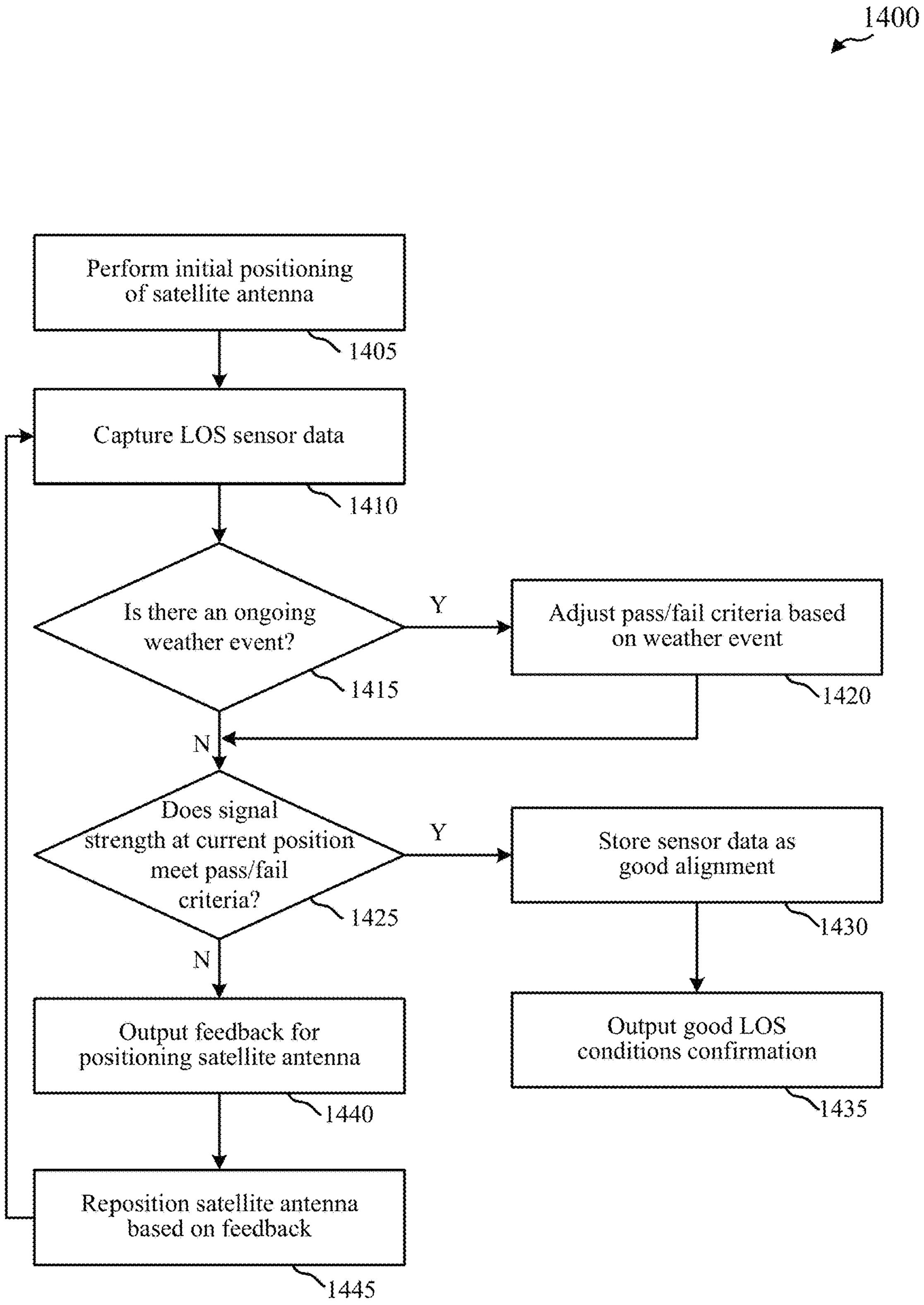
FIG. 14 is a flowchart illustrating an example of a method for aligning a satellite antenna in accordance with various aspects of the disclosure.

FIG. 14 is a flowchart illustrating an example of a method for aligning a satellite antenna in accordance with various aspects of the disclosure. For clarity, the method 1400 is described below with reference to aspects of the satellite antenna 130 described with reference to FIGS. 1, 2A, 2B, 3-7, and 12 and the alignment device 505 described with reference to FIGS. 5-8. In some examples, an alignment device or satellite antenna may execute sets of codes to control the functional elements of the alignment device to perform the functions described below. Additionally or alternatively, the alignment device may perform of the functions described below using multi-purpose hardware. In various examples, the functionality of the alignment device may be spread across multiple devices.

At block 1405, the method 1400 includes performing an initial positioning of the satellite antenna. The initial positioning of the satellite antenna may be performed by an installer. At block 1410, LOS sensor data may capture data for the initial position. The method 1400 determines if an ongoing weather event is occurring at this time, at block 1415. If there is an ongoing weather event between the satellite antenna and the satellite, the method 1400 may adjust a pass/fail criteria for approval of the installation based on the weather event at block 1420. The adjustment may compensate for any ways the satellite antenna performance may be affected by the weather, for example. The method 1400 then proceeds to block 1425. If there is no ongoing weather event, the method 1400 proceeds straight to block 1425.

At block 1425, the method 1400 may determine whether the LOS of the sensor data meets the pass/fail criterial for approval of the installation. The pass/fail criteria may be, for example, a threshold signal strength. If the satellite antenna has a signal strength that meets the pass/fail criteria, the method 1400 proceeds to block 1430 to store the sensor data as corresponding to a known good and unobstructed alignment (e.g., a good LOS condition). Next, the method 1400 outputs a good LOS conditions confirmation at block 1435.

However, if the LOS of the sensor data is not aligned with the known satellite position, the method 1400 proceeds to block 1440 to output feedback for correctly positioning the satellite antenna. At block 1445, the installer or automated controls of the satellite antenna reposition the satellite antenna based on the feedback. For example, the feedback may be displayed as an augmented reality image on an output device with a reference marker showing the position of the satellite as an overlay. The method 1400 returns to block 1410 to capture additional LOS sensor data. The method 1400 repeats until a good LOS conditions of the satellite antenna have been achieved.

The operation(s) at blocks 1405-1445 may be performed using the alignment device described with reference to FIGS. 5-8. Thus, the method 1400 may be for use in a satellite communication system. It should be noted that the method 1400 is just one implementation and that the operations of the method 1400 may be rearranged or otherwise modified such that other implementations are possible.

Figure 15:
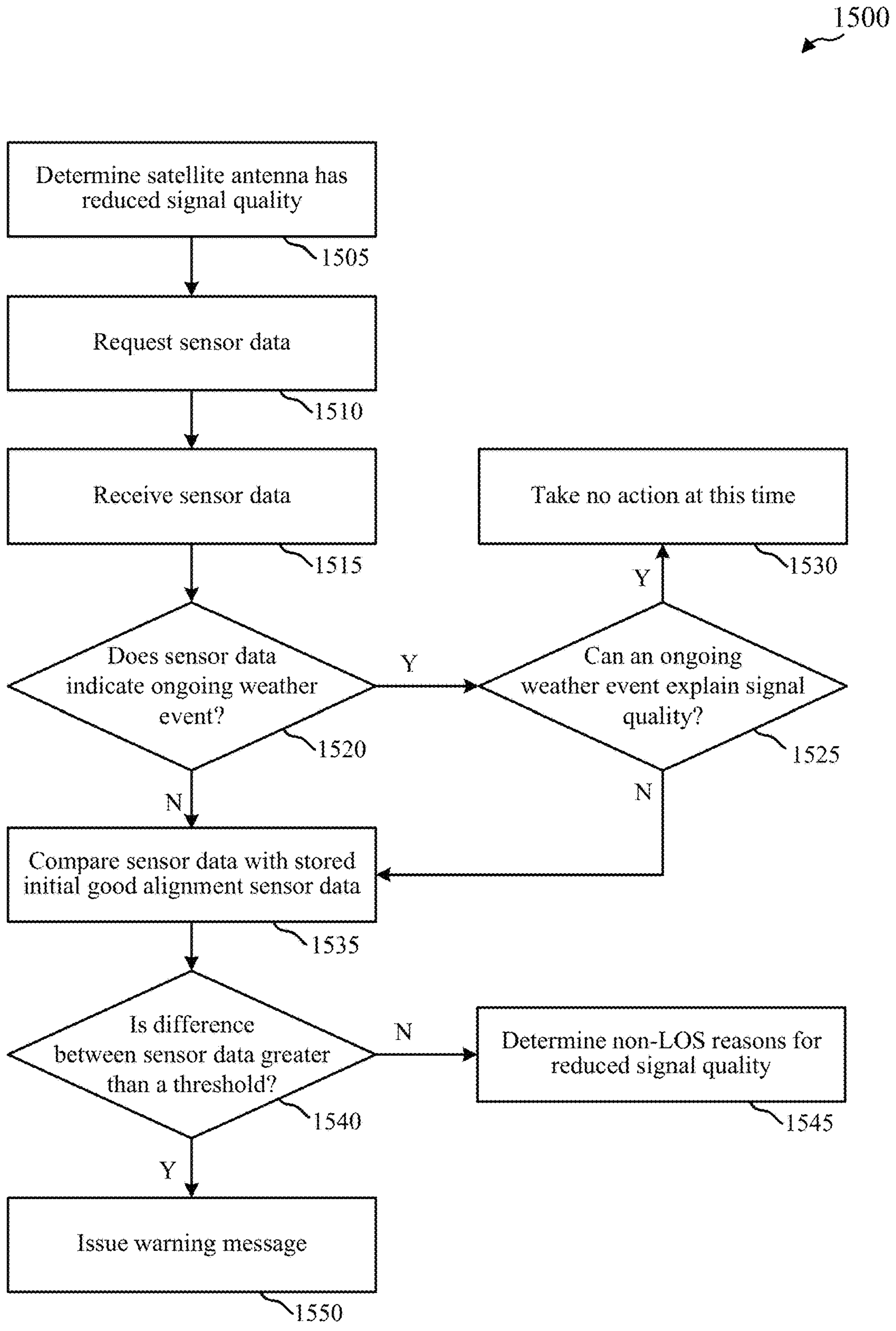
FIG. 15 is a flowchart illustrating an example of a method for checking a satellite antenna alignment in response to reduced signal quality in accordance with various aspects of the disclosure.

FIG. 15 is a flowchart illustrating an example of a method 1500 for checking a satellite antenna alignment in response to reduced signal quality in accordance with various aspects of the disclosure. For clarity, the method 1500 is described below with reference to aspects of the satellite antenna 130 described with reference to FIGS. 1, 2A, 2B, 3-7, and 12 and the alignment device 505 described with reference to FIGS. 5-8. In some examples, an alignment device or satellite antenna may execute sets of codes to control the functional elements of the alignment device to perform the functions described below. Additionally or alternatively, the alignment device may perform of the functions described below using multi-purpose hardware. In various examples, the functionality of the alignment device may be spread across multiple devices.

At block 1505, the method 1500 determines that the satellite antenna has reduced signal quality. Without any other reason why the satellite antenna signal quality is poor, the method 1500 may proceed to determine if the satellite antenna is misaligned or obstructed by a weather event or object. To do so, the method 1500 requests sensor data from an LOS sensor of the satellite antenna at block 1510.

At block 1515, the method 1500 receives the LOS sensor data. The method 1500 determines whether the sensor data indicates an ongoing weather event at block 1520. If so, the method 1500 determines whether the ongoing weather event can explain the reduced signal quality at block 1525. For example, based on the sky temperature, the method 1500 may estimate the amount of signal attenuation due to the weather event and compared the estimation to the signal quality degradation. If the weather event can explain the reduced signal quality (e.g., the estimate is close to the signal quality degradation), the method 1500 proceeds to block 1530 and takes no action at that time.

If the ongoing weather event cannot explain the poor signal quality or the sensor data does not indicate an ongoing weather event, the method 1500 proceeds to block 1535. At block 1535, the method 1500 compares the LOS sensor data with stored sensor data for initial good LOS conditions. At block 1540, the method 1500 determines whether there is a difference between the LOS sensor data and the good LOS conditions that is greater than a threshold amount. If not, the method 1500 proceeds to block 1545 to determine non-LOS reasons (e.g., a reason not related to misalignment or obstruction, such as a software problem or another problem elsewhere in the communication system) for the reduced signal quality. If so, the method 1500 proceeds to block 1550 and issues a warning message or signal.

In some examples, the method 1500 determines whether an ongoing weather event can explain the reduced signal quality at block 1520 after the method 1500 checks the LOS conditions for misalignments and obstructions at block 1534.

The operation(s) at blocks 1505-1550 may be performed using the alignment device described with reference to FIGS. 5-8. Thus, the method 1500 may be for use in a satellite communication system. It should be noted that the method 1500 is just one implementation and that the operations of the method 1500 may be rearranged or otherwise modified such that other implementations are possible.

Figure 16:
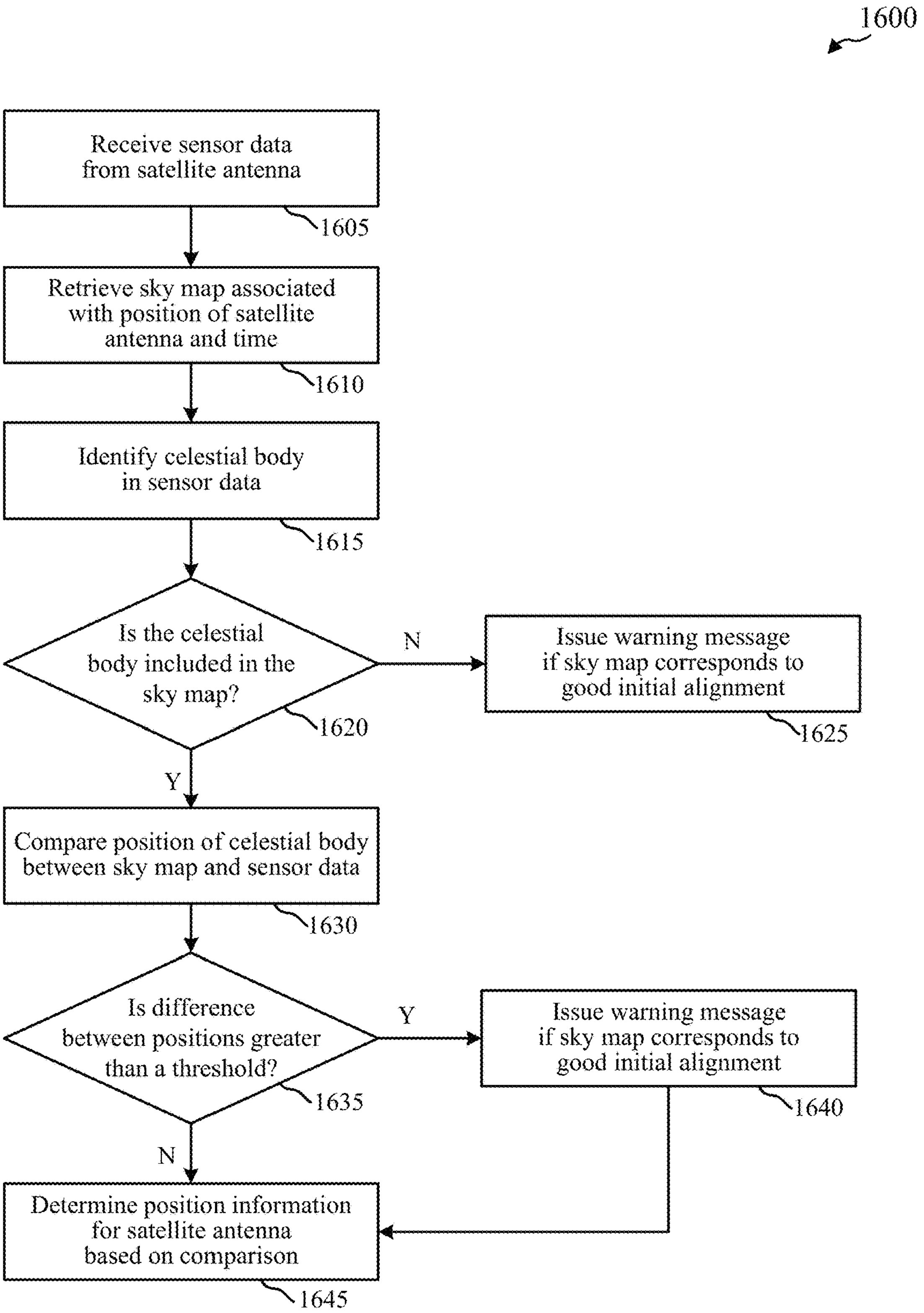
FIG. 16 is a flowchart illustrating an example of a method for determining an alignment of a satellite antenna in accordance with various aspects of the disclosure.

FIG. 16 is a flowchart illustrating an example of a method 1600 for determining an alignment of a satellite antenna in accordance with various aspects of the disclosure. For clarity, the method 1600 is described below with reference to aspects of the alignment device 505 described with reference to FIGS. 5-8. In some examples, an alignment device may execute sets of codes to control the functional elements of the alignment device to perform the functions described below. Additionally or alternatively, the alignment device may perform of the functions described below using multi-purpose hardware. In various examples, the functionality of the alignment device may be spread across multiple devices.

At block 1605, the method 1600 receives LOS sensor data from the satellite antenna. At block 1610, the method 1600 retrieves a sky map associated with a position (e.g., customer location) of the satellite antenna as well as the time when the LOS sensor data was captured.

The method 1600 may identify a celestial body in the LOS sensor data at block 1615. The celestial body may be, for example, the moon, planets, a star (which may be the sun), a nebula, a constellation, spacecraft, the target satellite, or the like. If there is no identifiable celestial body in the LOS sensor data, and the sky map corresponds to good LOS conditions and does include a celestial body, the method 1600 may conclude the satellite antenna is misaligned or obstructed and issues a warning message. However, if there is an identifiable celestial body, the method 1600 queries whether the celestial body is included in the sky map at block 1620.

If the identified celestial body is included in the sky map, the method 1600 compares the position of the celestial body in the sky map and the LOS sensor data at block 1630. At block 1635, the method 1600 determines whether any difference between the positions is greater than a threshold distance. If the sky map corresponds to an area of sky that is associated with good LOS conditions (e.g., aligned and unobstructed), the method 1600 proceeds to block 1640 to issue a warning message if the difference between the positions is greater than the threshold distance. If the difference between the positions is less than or equal to a threshold distance, the method 1600 determines position information for the satellite antenna based on the comparison at block 1645. The position information may include, for example, at least one of an elevation angle, an azimuth angle, a latitude, or a longitude of the satellite antenna.

The operation(s) at blocks 1605-1645 may be performed using the alignment device described with reference to FIGS. 5-8. Thus, the method 1600 may be for use in a satellite communication system. It should be noted that the method 1600 is just one implementation and that the operations of the method 1600 may be rearranged or otherwise modified such that other implementations are possible.

In some examples, aspects from two or more of the methods 1300, 1400, 1500, and 1600 may be combined. It should be noted that the methods 1300, 1400, 1500, and 1600 are just example implementations, and that the operations of the methods 1300-1600 may be rearranged or otherwise modified such that other implementations are possible.

The detailed description set forth above in connection with the appended drawings describes examples and does not represent the only examples that may be implemented or that are within the scope of the claims. The term “example,” when used in this description, mean “serving as an example, instance, or illustration,” and not “preferred” or “advantageous over other examples.” The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for use in a satellite communication system, comprising:

receiving first sensor data captured by a line-of-sight (LOS) sensor of a satellite antenna at a first time, the first sensor data indicating a first position of one or more reference features in a first field of view (FOV) of the satellite antenna aligned with a satellite of the satellite communication system;

receiving second sensor data captured by the LOS sensor at a second time after the first time, the second sensor data indicating a second position of the one or more reference features in a second FOV of the satellite antenna;

determining the first position of the one or more reference features in the first FOV;

determining the second position of the one or more reference features in the second FOV;

comparing the first position with the second position;

determining that the one or more reference features have moved position between the first FOV and the second FOV based on the comparison; and determining that a misalignment of the satellite antenna with the satellite has occurred between the first time and the second time based on movement of the one or more reference features.

2. The method of claim 1, wherein the one or more reference features do not obstruct a beam contour of the satellite antenna.

3. The method of claim 1, wherein determining that the misalignment has occurred comprises determining that a beam contour of the satellite antenna has moved such that the beam contour does not include the satellite at the second time.

4. The method of claim 1, further comprising selecting the one or more reference features from a number of features in the first FOV.

5. The method of claim 1, wherein:

the first sensor data comprises a first image, the second sensor data comprises a second image, the first position of the one or more reference features is determined based on a first pixel map of the first image, and the second position of the one or more reference features is determined based on a second pixel map of the second image.

6. The method of claim 1, further comprising:

predicting a service interruption for the satellite antenna for communicating a communication signal with the satellite.

7. The method of claim 6, wherein the satellite is a first satellite, the method further comprising:

automatically switching service for the satellite antenna from the first satellite to a second satellite prior to the predicted service interruption.

8. The method of claim 6, further comprising issuing a warning message that indicates that the satellite antenna may become misaligned or obstructed and result in the service interruption.

9. A satellite communication system, comprising:

a satellite antenna configured to communicate with a satellite;

a satellite transceiver that transmits and receives a communication signal via the satellite antenna;

a line-of-sight (LOS) sensor coupled with the satellite transceiver that captures first sensor data at a first time and second sensor data at a second time, wherein the sensor data is different from the communication signal, wherein the first sensor data indicates a first position of one or more reference features in a first field of view (FOV) of the satellite antenna aligned with the satellite, and wherein the second sensor data indicates a second position of the one or more reference features in a second FOV of the satellite antenna; and an alignment device configured to:

receive the first sensor data at the first time and the second sensor data at the second time;

determine the first position of the one or more reference features in the first FOV;

determine the second position of the one or more reference features in the second FOV;

compare the first position with the second position;

determine that the one or more reference features have moved position between the first FOV and the second FOV based on the comparison; and determine that a misalignment of the satellite antenna with the satellite has occurred between the first time and the second time based on movement of the one or more reference features.

10. The satellite communication system of claim 9, wherein the one or more reference features do not obstruct a beam contour of the satellite antenna.

11. The satellite communication system of claim 9, wherein the alignment device is configured to determine the misalignment based on a determination that a beam contour of the satellite antenna has moved such that the beam contour does not include the satellite at the second time.

12. The satellite communication system of claim 9, wherein the alignment device is further configured to select the one or more reference features from a number of features in the FOV.

13. The satellite communication system of claim 9, wherein:

the first sensor data comprises a first image, the second sensor data comprises a second image, the first position of the one or more reference features is determined based on a first pixel map of the first image, and the second position of the one or more reference features is determined based on a second pixel map of the second image.

14. The satellite communication system of claim 9, wherein the alignment device is further configured to predict a service interruption for the satellite antenna for communicating a communication signal with the satellite.

15. The satellite communication system of claim 14, wherein the satellite is a first satellite and wherein the alignment device is further configured to automatically switch service for the satellite antenna from the first satellite to a second satellite prior to the predicted service interruption.

16. The satellite communication system of claim 14, wherein the alignment device is further configured to issue a warning message that indicates that the satellite antenna may become misaligned or obstructed and result in the service interruption.

17. An alignment device for a satellite communication system, comprising:

one or more memories;

one or more processors coupled with the one or more memories and configured to caust the alignment device to:

receive first sensor data captured by a line-of-sight (LOS) sensor of a satellite antenna at a first time, the first sensor data indicating a first position of one or more reference features in a first field of view (FOV) of the satellite antenna aligned with a satellite of the satellite communication system;

receive second sensor data captured by the LOS sensor at a second time after the first time, the second sensor data indicating a second position of the one or more reference features in a second FOV of the satellite antenna;

determine the first position of the one or more reference features in the first FOV;

determine the second position of the one or more reference features in the second FOV;

compare the first position with the second position;

determine that the one or more reference features have moved position between the first FOV and the second FOV based on the comparison; and determine that a misalignment of the satellite antenna with the satellite has occurred between the first time and the second time based on movement of the one or more reference features.

18. The alignment device of claim 17, wherein the one or more reference features do not obstruct a beam contour of the satellite antenna.

19. The alignment device of claim 17, the one or more processors are further configured to cause the alignment device to:

determine that a beam contour of the satellite antenna has moved such that the beam contour does not include the satellite at the second time.

20. The alignment device of claim 17, wherein the one or more processors are further configured to cause the alignment device to:

select the one or more reference features from a number of features in the first FOV.

21. The alignment device of claim 17, wherein:

the first sensor data comprises a first image, the second sensor data comprises a second image, the first position of the one or more reference features is determined based on a first pixel map of the first image, and the second position of the one or more reference features is determined based on a second pixel map of the second image.

22. The alignment device of claim 17, wherein the one or more processors are further configured to cause the alignment device to:

predict a service interruption for the satellite antenna for communicating a communication signal with the satellite.

23. The alignment device of claim 22, wherein the satellite is a first satellite, and wherein the one or more processors are further configured to cause the alignment device to:

automatically switch service for the satellite antenna from the first satellite to a second satellite prior to the predicted service interruption.

24. The alignment device of claim 22, wherein the one or more processors are further configured to cause the alignment device to:

issue a warning message that indicates that the satellite antenna may become misaligned or obstructed and result in the service interruption.

* * * * *